United States Patent
Standefer, III et al.

(10) Patent No.: US 11,475,320 B2
(45) Date of Patent: Oct. 18, 2022

(54) CONTEXTUAL ANALYSIS OF ISOLATED COLLECTIONS BASED ON DIFFERENTIAL ONTOLOGIES

(71) Applicant: Microsoft Technology Licensing, LLC, Redmond, WA (US)

(72) Inventors: Robert Standefer, III, Duvall, WA (US); Christopher L. Mullins, Redmond, WA (US); John A. Taylor, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 641 days.

(21) Appl. No.: 15/344,027

(22) Filed: Nov. 4, 2016

(65) Prior Publication Data

US 2018/0129951 A1    May 10, 2018

(51) Int. Cl.
*G06N 5/02*    (2006.01)

(52) U.S. Cl.
CPC .................... *G06N 5/025* (2013.01)

(58) Field of Classification Search
CPC ..................................... G06N 5/025
See application file for complete search history.

(56) References Cited

U.S. PATENT DOCUMENTS

| | | |
|---|---|---|
| 5,721,943 A | 2/1998 | Johnson |
| 5,802,529 A | 9/1998 | Nakatsuyama et al. |
| 6,560,592 B1 | 5/2003 | Reid et al. |
| 6,865,574 B1 | 3/2005 | McCullough |
| 6,947,943 B2 | 9/2005 | Deanna et al. |
| 7,016,880 B1 | 3/2006 | Adams et al. |
| 7,068,849 B2 | 6/2006 | Zandi et al. |
| 7,069,335 B1 | 6/2006 | Layman et al. |

(Continued)

FOREIGN PATENT DOCUMENTS

| | | |
|---|---|---|
| CN | 103714129 | 4/2014 |
| EP | 1301881 A1 | 4/2003 |

(Continued)

OTHER PUBLICATIONS

"Non Final Office Action Issued in U.S. Appl. No. 15/344,109", dated Oct. 4, 2018, 17 Pages.

(Continued)

*Primary Examiner* — Lut Wong

(57) ABSTRACT

The present disclosure relates to systems and methods of overlaying a plurality of isolated collections to generate an overlaid isolated collection. In an example, a first and second isolated collection having at least one common resource may be overlaid. A first and second inference ruleset may be extracted from the first and second isolated collection, respectively. Based on the first and second inference ruleset, one or more suggestions may be generated relating to conflicting inference rules. A suggestion may comprise selecting a subset of the conflicting inference rules (e.g., none, some, or all of the rules) for inclusion in the overlay isolated collection. Another suggestion may comprise generating a new inference rule based on the conflicting inference rules. An indication relating to the suggestions may be received. The indication may be used to generate a third isolated collection and a third inference ruleset.

20 Claims, 14 Drawing Sheets

(56) References Cited

U.S. PATENT DOCUMENTS

| | | | |
|---|---|---|---|
| 7,418,497 B2 | 8/2008 | Hagale et al. | |
| 7,668,834 B2 | 2/2010 | McCullough | |
| 7,702,603 B1 | 4/2010 | Hauser | |
| 8,001,551 B2 | 8/2011 | Roy et al. | |
| 8,112,377 B2 | 2/2012 | Schmidt | |
| 8,140,362 B2 | 3/2012 | Deshpande et al. | |
| 8,185,558 B1 | 5/2012 | Narayanan et al. | |
| 8,428,981 B2 | 4/2013 | Li et al. | |
| 8,429,179 B1 | 4/2013 | Mirhaji | |
| 8,443,005 B1 | 5/2013 | Goldman et al. | |
| 8,620,964 B2 | 12/2013 | Tsatsou et al. | |
| 8,739,016 B1 | 5/2014 | Goldman et al. | |
| 8,788,330 B2 | 7/2014 | Leffert | |
| 8,825,711 B2 | 9/2014 | Chan et al. | |
| 8,838,707 B2 | 9/2014 | Lawson et al. | |
| 9,075,873 B2 | 7/2015 | Vanderwende et al. | |
| 9,087,236 B2 | 7/2015 | Dhoolia et al. | |
| 9,301,016 B2 | 3/2016 | Archibong et al. | |
| 9,317,557 B2 | 4/2016 | Shao et al. | |
| 9,336,306 B2 | 5/2016 | McAteer et al. | |
| 9,342,622 B2 | 5/2016 | Segaran | |
| 9,348,880 B1 | 5/2016 | Kramer et al. | |
| 9,367,809 B2 | 6/2016 | Puri et al. | |
| 9,396,046 B2 | 7/2016 | Laredo et al. | |
| 9,400,822 B2 | 7/2016 | Schrock et al. | |
| 2002/0123956 A1 | 9/2002 | Galuten | |
| 2003/0217033 A1 | 11/2003 | Sandler et al. | |
| 2003/0217081 A1 | 11/2003 | White et al. | |
| 2003/0236767 A1 | 12/2003 | Akiyama | |
| 2004/0128296 A1 | 7/2004 | Krishnamurthy et al. | |
| 2005/0193361 A1 | 9/2005 | Vitanov et al. | |
| 2005/0276479 A1 | 12/2005 | Goldberg et al. | |
| 2005/0278354 A1 | 12/2005 | Gupta et al. | |
| 2006/0155725 A1 | 7/2006 | Foster et al. | |
| 2007/0179995 A1 | 8/2007 | Prahlad et al. | |
| 2007/0282711 A1 | 12/2007 | Ullman et al. | |
| 2008/0082466 A1 | 4/2008 | Meijer et al. | |
| 2008/0140602 A1* | 6/2008 | Roth | G06F 16/215 706/59 |
| 2008/0178164 A1 | 7/2008 | Brown et al. | |
| 2008/0307337 A1 | 12/2008 | Marinkovich et al. | |
| 2009/0024648 A1 | 1/2009 | Heix et al. | |
| 2009/0063559 A1 | 3/2009 | Rhodes et al. | |
| 2009/0070299 A1 | 3/2009 | Parikh et al. | |
| 2009/0089265 A1 | 4/2009 | Saito et al. | |
| 2009/0164416 A1 | 6/2009 | Guha | |
| 2009/0187517 A1 | 7/2009 | Mihalkova et al. | |
| 2009/0259944 A1 | 10/2009 | Wu | |
| 2009/0293004 A1* | 11/2009 | Emam | G06F 3/0481 715/762 |
| 2010/0023481 A1 | 1/2010 | Mcgoveran | |
| 2010/0030725 A1 | 2/2010 | Mendis et al. | |
| 2010/0036788 A1 | 2/2010 | Wu et al. | |
| 2010/0082646 A1 | 4/2010 | Meek et al. | |
| 2010/0223223 A1 | 9/2010 | Sandler et al. | |
| 2010/0318488 A1 | 12/2010 | Oliver et al. | |
| 2012/0185826 A1 | 7/2012 | Wheeler et al. | |
| 2013/0117185 A1 | 5/2013 | Collison et al. | |
| 2013/0238667 A1 | 9/2013 | Carvalho et al. | |
| 2013/0246435 A1 | 9/2013 | Yan et al. | |
| 2014/0046981 A1 | 2/2014 | Adams et al. | |
| 2014/0067850 A1 | 3/2014 | Schrock et al. | |
| 2014/0129504 A1 | 5/2014 | Soon-shiong | |
| 2014/0164298 A1 | 6/2014 | Goranson et al. | |
| 2014/0172914 A1 | 6/2014 | Elnikety et al. | |
| 2014/0279957 A1 | 9/2014 | Moore et al. | |
| 2014/0330594 A1 | 11/2014 | Roberts et al. | |
| 2014/0337373 A1 | 11/2014 | Morsi et al. | |
| 2015/0072653 A1 | 3/2015 | Fan et al. | |
| 2015/0128121 A1 | 5/2015 | Garcia | |
| 2015/0242186 A1 | 8/2015 | Yuen et al. | |
| 2015/0242762 A1* | 8/2015 | Cox | G06Q 30/0621 706/11 |
| 2015/0254561 A1* | 9/2015 | Singal | G06F 16/24564 707/713 |
| 2015/0280999 A1 | 10/2015 | Chart et al. | |
| 2015/0379409 A1 | 12/2015 | Hu et al. | |
| 2016/0055423 A1 | 2/2016 | Buchanan et al. | |
| 2016/0077920 A1 | 3/2016 | Regni et al. | |
| 2016/0149953 A1 | 5/2016 | Hidayat | |
| 2016/0224674 A1 | 8/2016 | Miller et al. | |
| 2016/0275347 A1 | 9/2016 | Sukhodolov et al. | |
| 2016/0301766 A1 | 10/2016 | Ionescu et al. | |
| 2017/0097984 A1* | 4/2017 | Haldar | G06F 16/288 |
| 2018/0129546 A1 | 5/2018 | Mullins et al. | |
| 2018/0129695 A1 | 5/2018 | Standefer et al. | |
| 2018/0129697 A1 | 5/2018 | Mullins et al. | |
| 2018/0129715 A1 | 5/2018 | Standefer et al. | |
| 2018/0129751 A1 | 5/2018 | Mullins et al. | |

FOREIGN PATENT DOCUMENTS

| | | | |
|---|---|---|---|
| EP | 1681645 | 7/2006 | |
| WO | 175679 | 10/2001 | |
| WO | 2007048432 | 5/2007 | |
| WO | WO-2013093682 A1 * | 6/2013 | G06Q 10/063 |
| WO | 2015006718 A1 | 1/2015 | |

OTHER PUBLICATIONS

"International Search Report and Written Opinion Issued in PCT Application No. PCT/US17/059626", dated May 28, 2018, 16 pages.

"Invitation to Pay Additional Fee Issued in PCT Application No. PCT/US17/059626", dated Apr. 3, 2018, 10 Pages.

Jorge, et al., "Post-Processing Operators for Browsing Large Sets of Association Rules", In Proceedings of the 5th Int'l. Conference on Discovery Science, Nov. 24, 2002, 4 pages.

PCT International Search Report and Written Opinion Issued in Application No. PCT/US2017/059629, dated Dec. 22, 2017, 14 Pages.

Saygin et al., "Association Rules for Supporting Hoarding in Mobile Computing Environments", In Proceedings of Tenth International Workshop on Research Issues in Data Engineering, Feb. 29, 2000, 2 pages.

Wing, et al., "Smart Retrieval and Sharing of Information Resources Based on Contexts of User-Information Relationships", In the Proceedings of the 19th International Conference on Advanced Information Networking and Applications(AINA), vol. 2, Mar. 25, 2005, 6 Pages.

PCT International Search Report and Written Opinion Issued in Application No. PCT/US2017/059621, dated Jan. 16, 2018, 11 Pages.

"Non Final Office Action Issued in U.S. Appl. No. 15/343,815", dated Dec. 27, 2018, 12 Pages.

"Non Final Office Action Issued in U.S. Appl. No. 15/344,259", dated Jan. 10, 2019, 7 Pages.

"Non Final Office Action Issued in U.S. Appl. No. 15/344,336", dated Jan. 28, 2019, 31 Pages.

"Non Final Office Action Issued in U.S. Appl. No. 15/344,405", dated May 8, 2019, 21 Pages.

"Final Office Action Issued in U.S. Appl. No. 15/344,336", dated Aug. 7, 2019, 6 Pages.

"Final Office Action Issued in U.S. Appl. No. 15/344,405", dated Nov. 19, 2019, 24 Pages.

"Notice of Allowance Issued in U.S. Appl. No. 15/344,405", dated May 19, 2020, 9 Pages.

"Office Action Issued in European Patent Application No. 17798068.7", dated Sep. 24, 2020, 5 Pages.

"File Versioning Rules", http://web.archive.org/web/20111004024745/http://msdn.microsoft.com/en-us/library/windows/desktop/aa368599(v=VS.85).aspx, Oct. 4, 2011, 2 pages.

"Keeping previous versions installed when installing CC 2015 applications", https://blogs.adobe.com/creativecloud/keeping-previous-versions-installed-when-installing-cc-2015-applications/, Jun. 15, 2015, 2 pages.

"Receiving API Updates in Real Time with Webhooks", https://developers.facebook.com/docs/graph-api/webhooks, Oct. 12, 2016, 8 pages.

(56) References Cited

OTHER PUBLICATIONS

"Subscribe for webhooks to get change notifications", https://msdn.microsoft.com/en-us/office/office365/howto/onenote-sync, May 30, 2016, 3 pages.
"Webhooks", http://web.archive.org/web/20150207190001/https://developer.github.com/webhooks/, Feb. 7, 2015, 5 pages.
asp.net Dynamic Data, https://web.archive.org/web/20100421030207/http:/msdn.microsoft.com/en-us/library/ee845452.aspx, Apr. 21, 2010, 7 pages.
Croitoru, et al., "A Conceptual Graph Based Approach to Ontology Similarity Measure", In Proceedings of 15th International Conference on Conceptual Structures, Jul. 22, 2007, 154-164 pages.
Dynamic model: adding new properties to virtual member manager entities at runtime, http://www.ibm.com/support/knowledgecenter/SSAW57_7.0.0/com.ibm.websphere.wim.doc/dynamicmodeladdingnewpropertiestowimentitiesatruntime.html, Oct. 14, 2016, 2 pages.
Dynamic\ user extensible entities using entity framework, http://stackoverflow.com/questions/15019705/dynamic-user-extensible-entities-using-entity-framework. Retrieved on: Oct. 14, 2016, 4 pages.
Ead, Stephen, "Proof-Theoretic Validity", In Journal of Foundations of Logical Consequence, Apr. 16, 2012, 22 pages.
Gao, et al., "Ontology-Based Semantic Similarity: A New Approach Based on Analysis of the Concept Intent", In Proceedings of the International Conference on Machine Learning and Cybernetics, Jul. 14, 2013, pp. 676-681.
Gasse, et al., "Rewriting Rules into SROIQ Axioms", In Proceedings of 21st International Workshop on Description Logics, May 13, 2008, 10 pages.
Goedtel, et al., "Azure Automation webhooks", https://azure.microsoft.com/en-us/documentation/articles/automation-webhooks/, Sep. 12, 2016, 12 pages.
Hu, et al., "GMO: A Graph Matching for Ontologies", In Proceedings of the K-CAP Workshop on Integrating Ontologies, Oct. 2, 2005, 8 pages.
Irani, Romin, "How to Integrate Webhooks with the Slack API", http://www.programmableweb.com/news/how-to-integrate-webhooks-slack-api/how-to/2015/10/20, Oct. 20, 2015, 8 pages.
Leggetter, Phil, "What are WebHooks and How Do They Enable a Real-time Web?", http://www.programmableweb.com/news/what-are-webhooks-and-how-do-they-enable-real-time-web/2012/01/30, Jan. 30, 2012, 5 pages.
Malihi, Ardy, "Entity Framework Dynamic Model Builder", https://github.com/ardymalihi/Dynamix-EntityFramework, Oct. 14, 2016, 3 pages.
Nielsen, Henrik F, "Introducing Microsoft asp.net WebHooks Preview", https://blogs.msdn.microsoft.com/webdev/2015/09/04/introducing-microsoft-asp-net-webhooks-preview/, Sep. 4, 2015, 17 pages.
Omelayenko, et al., "Tracking Changes in RDF(S) Repositories", In Proceedings of the Workshop on Knowledge Transformation for the Semantic Web, Jul. 23, 2012, 121 pages.
Pujara, et al., "Ontology-Aware Partitioning for Knowledge Graph Identification", In Proceedings of the workshop on automated knowledge base construction, Oct. 27, 2013, 5 pages.
Sumurthy, et al., "Working with Webhooks in Microsoft Graph", Oct. 12, 2016, 4 pages.
Thornber, K. K., "A Key to Fuzzy-Logic Inference", In International Journal of Approximate Reasoning, Feb. 2, 1993, pp. 105-121.
Vanderlyn, et al., "Similarity in Semantic Graphs: Combining Structural, Literal, and Ontology-based Measures", In Proceedings of Tenth International Conference on Semantic Technology for Intelligence, Defense, and Security, Nov. 18, 2015, pp. 1-8.
Vega, Diego, "Support for "dynamic" entity models", https://github.com/aspnet/EntityFramework/issues/2282, May 28, 2015, 3 pages.
Zhang, et al., "Semantic similarity between ontologies at different scales", In Proceedings of IEEE/CAA Journal of Automatica Sinica, vol. 3, Issue 2, Apr. 10, 2016, pp. 132-140.
"Office Action Issued in European Patent Application No. 17798068.7", dated May 10, 2021, 6 Pages.
"Summons to Attend Oral Proceedings Issued in European Patent Application No. 17798068.7", Mailed Date: Jan. 17, 2022, 9 Pages.
"Office Action Issued in Indian Patent Application No. 201947017214", dated Sep. 27, 2021, 7 Pages.
"Notice of Allowance Issued in European Patent Application No. 17798068.7", dated Aug. 1, 2022, 7 Pages.

* cited by examiner

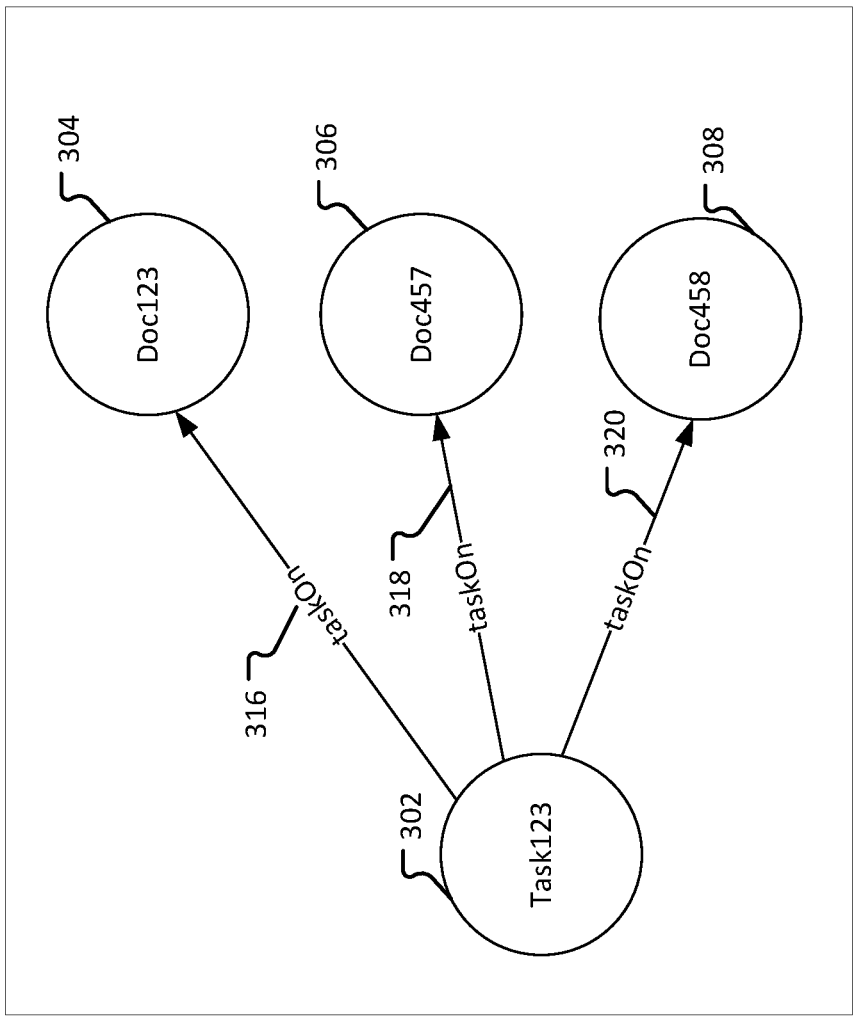

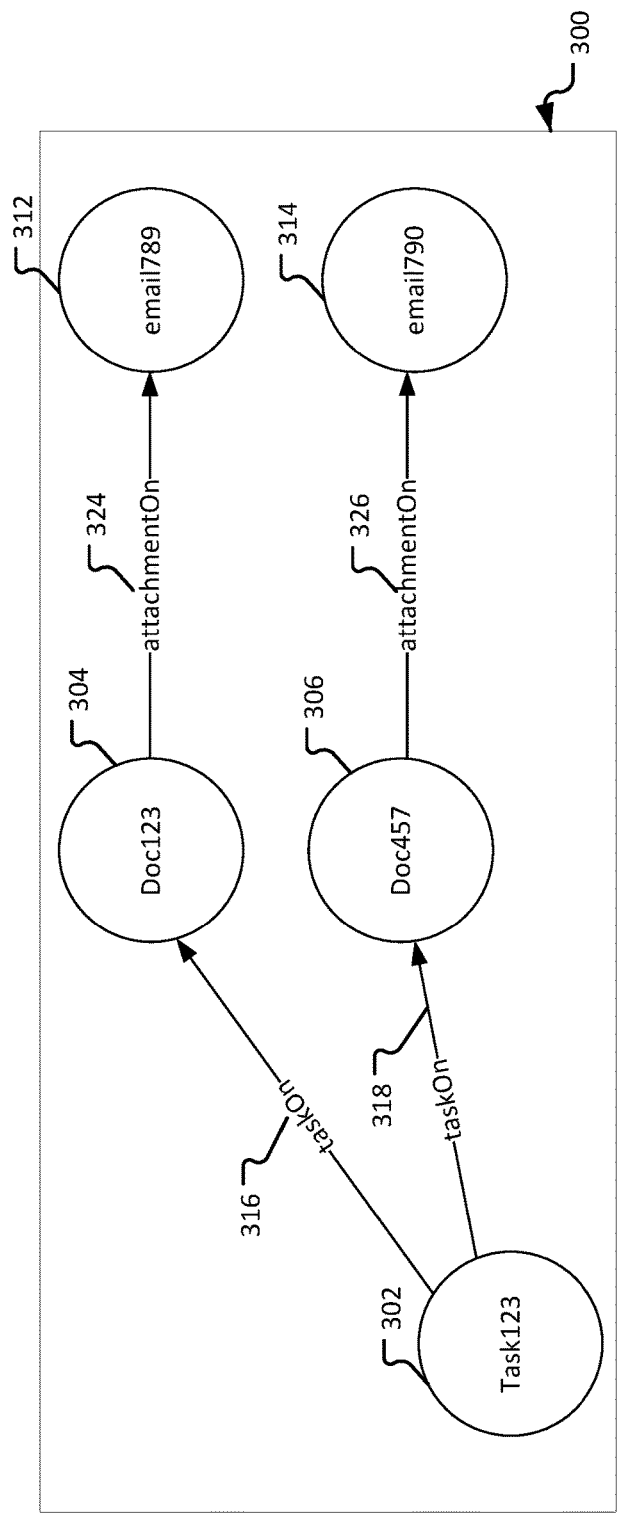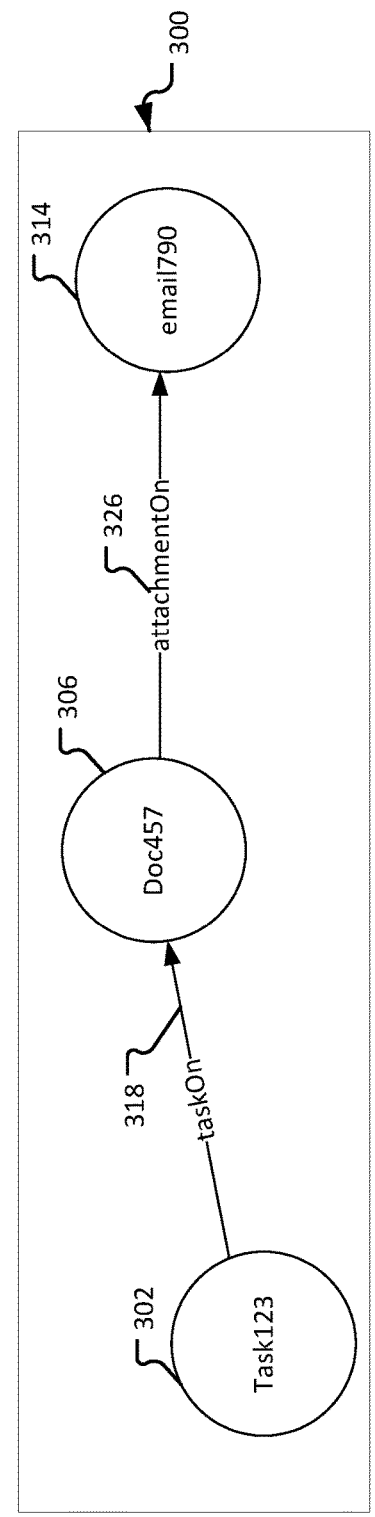
FIG. 3D
FIG. 3E

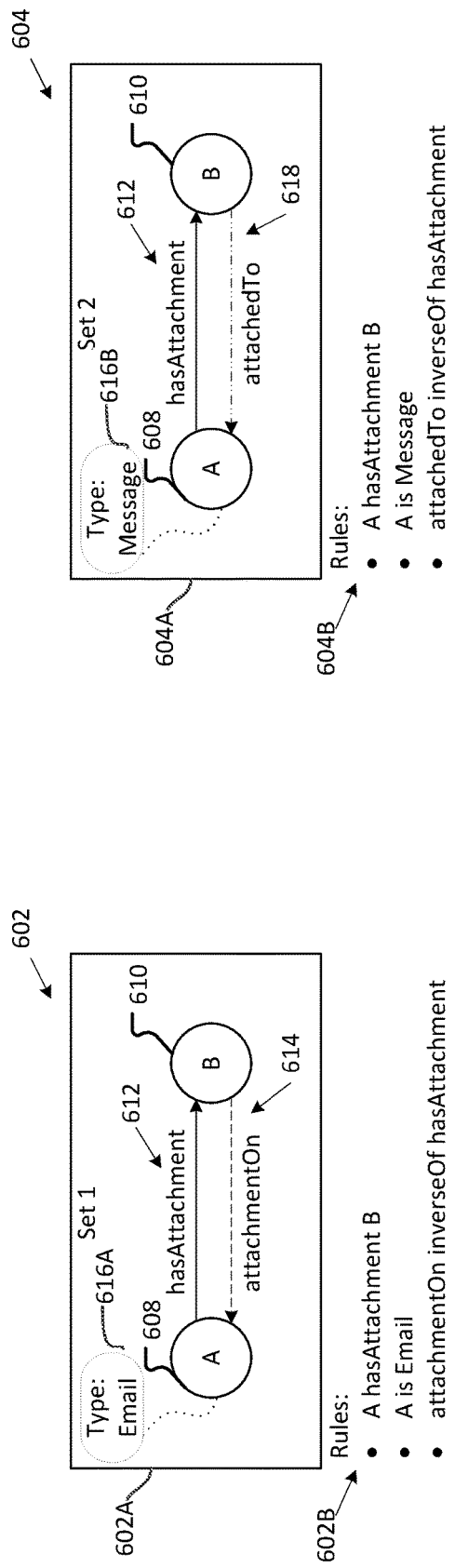
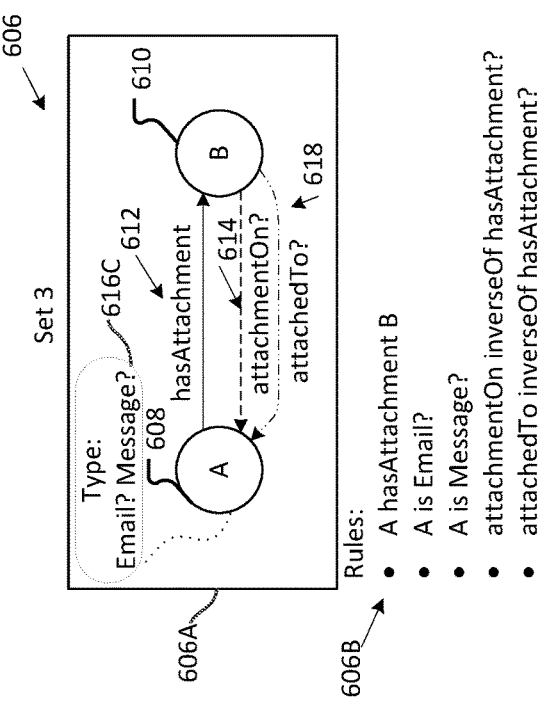
FIG. 6A
FIG. 6B
FIG. 6C

CONTEXTUAL ANALYSIS OF ISOLATED COLLECTIONS BASED ON DIFFERENTIAL ONTOLOGIES

BACKGROUND

Isolated collections of resources and relationships enable powerful interaction, analysis, and processing of data contained within. Further, isolated collections are data-agnostic, meaning they may be used to store any type of data and may be used to capture a wide array of relationships among the stored data. Inference rules may be applied to the isolated collection to generate one or more inferred relationships. These inferred relationships may provide further insight into the isolated collection data, thereby allowing richer queries and analysis to be performed. However, any insight gained from inferred relationships only spans the data within the isolated collection. If resources are further or alternatively described or related within other isolated collections, the external data is currently not included in queries or analysis.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods of overlaying a plurality of isolated collections to generate an overlaid isolated collection. In an example, a first and second isolated collection may be overlaid, wherein the first and second isolated collection contain at least one common resource. A first and second inference ruleset may be extracted from the first and second isolated collection, respectively. Based on the first and second inference ruleset, one or more suggestions may be generated relating to conflicting inference rules contained within the first and second ruleset. A suggestion may comprise selecting a subset of the conflicting inference rules (e.g., none, some, or all of the rules) or generating a new inference rule based on the conflicting inference rules, among others.

A selection may be received relating to the generated suggestions. Based on the selection, a third isolated collection may be generated, wherein the third isolated collection is comprised of resources and/or relationships from the first and second isolated collection. In some examples, a subset may be used, wherein the subset is comprised of resources and relationships that are directly or indirectly related to the at least one common resource. The third isolated collection may be associated with a third inference ruleset, which may also be generated based on the selection. As a result, the third inference ruleset may comprise a subset of inference rules from the first and second inference ruleset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 3B-3E illustrate an example query model that may be used to traverse an isolated collection.

FIGS. 6A-6B illustrate overviews of example isolated collections.

FIG. 6C illustrates an overview of overlaying two isolated collections.

DETAILED DESCRIPTION

Figure 1:
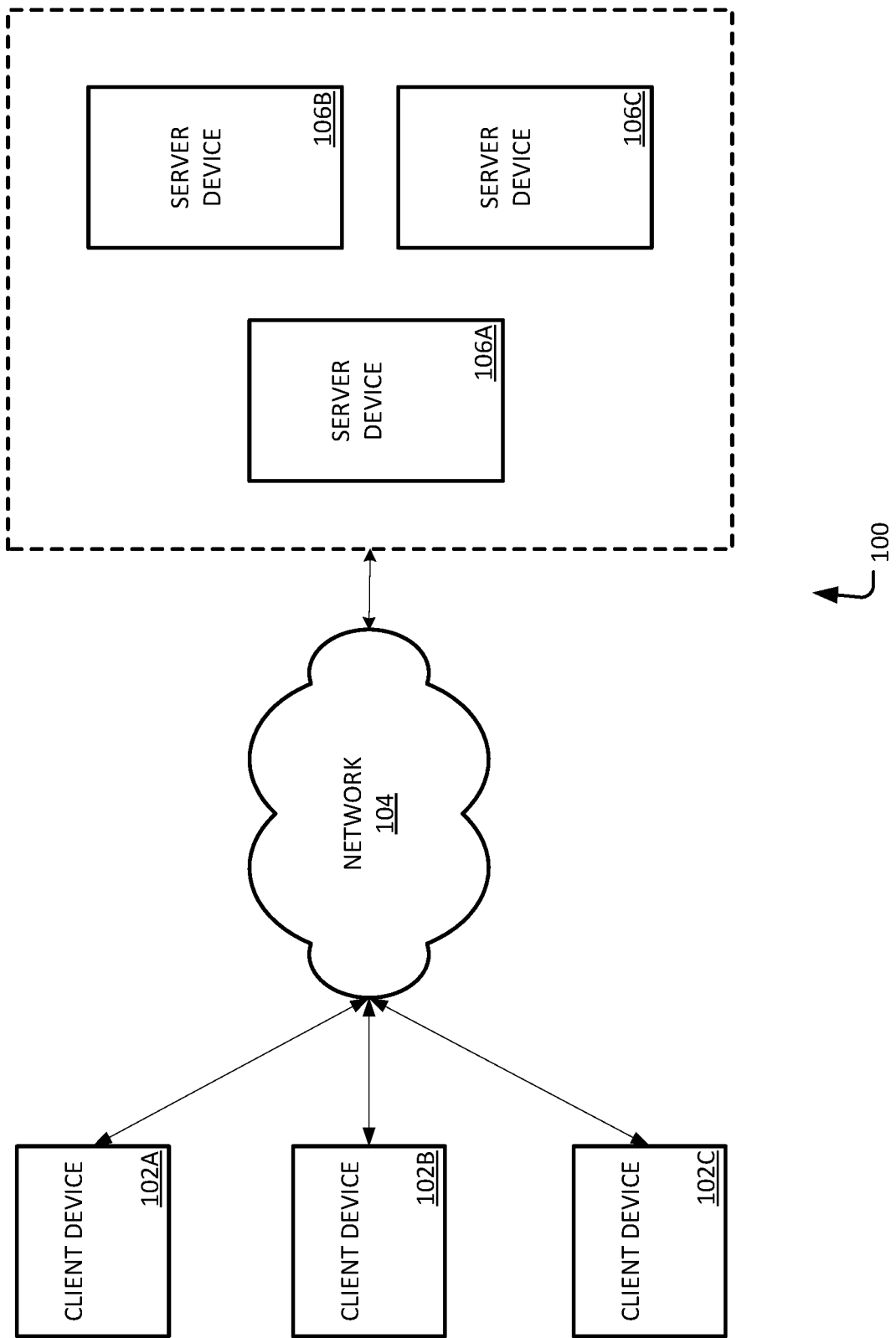
FIG. 1 illustrates an overview of an example system for overlaying isolated collections of resources and relationships.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of generating and querying isolated collections of resource identifiers and the relationships between those resources or resource identifiers. Each resource may be identified by a resource identifier, which may be a durable Uniform Resource Identifier (URI) pointing to the particular resource. The resource identifier may also be a uniform resource locator (URL), uniform resource name (URN), or other suitable identifier or pointers pointing to the resource itself. Relationships identify a correlation between two or more resources in the isolated collection. For instance, a first resource (e.g., a document) may be an attachment to a second resource (e.g., an e-mail). In such an example, the relationship between the e-mail and the document may be "hasAttachement" or other similar identifying text representing the relationship between the two resources.

The resources, or resource indicators, and/or relationships may be provided by a developer or other external source. Such resources, resources indicators, and relationships are referred to herein as asserted resources, asserted resource indicators, and asserted relationships. Each isolated collection may also be enriched to create additional relationships and in some examples additional resource indicators, by executing a ruleset against the data already in the isolated collection. The additional data generated through execution of such a ruleset is referred to herein as inferred data, such as inferred relationships, inferred resources, and inferred resource identifiers. Queries may then be executed against the isolated collection that includes both the asserted data and inferred data to provide richer results than would otherwise be available solely from the asserted data alone. The isolated collection may also be stored as graph database, and results to queries of the isolated collection may be displayed in a graphical format wherein resources are displayed as nodes and the relationships are displayed as edges. As used herein, an isolated collection of resource identifiers and the relationships between those resources or resource identifiers may be referred as a "Set." Further, access to the isolated collection may be controlled through various techniques to provide additional security measures for the content in each isolated collection, and each isolated collection may have different rule sets to generate unique and different inferred data to meet the particular needs of each application.

An isolated collection may be data-agnostic, meaning it may be used to store any type of resource and may be used to describe a wide array of relationships among the stored resources. As an example, a resource may represent many different forms of data ranging from a file, a document (or a portion thereof), a contact, a task, an e-mail or other communication, a communication channel, data representing a person, a calendar event, or other similar data items. In some examples, a resource may be associated with a resource identifier that is contained within a first and second isolated collection. Within each isolated collection, the relationships (e.g., asserted relationships and those generated as the result of inference rules) between the common resource and other resources may differ. Further, the type of resources stored within each isolated collections may also differ. By overlaying the first and second isolated collection, a third isolated collection may be generated.

The third isolated collection may comprise a plurality of resources from the first and second isolated collection. Asserted relationships may be formed among the plurality of resources within the third isolated collection based on the asserted relationships contained within the first and second isolated collection. A first and second inference ruleset may be associated with the first and second isolated collection, respectively, comprising inference rules that may be used to generate inferred relationships within the respective isolated collections. When overlaying the first and second isolated collection, the first and second inference ruleset may also be overlaid, thereby generating a third inference ruleset which may then be associated with the third isolated collection.

In some examples, an inference rule from the first inference ruleset may conflict with an inference rule from the second inference ruleset. A conflict may occur when a plurality of inference rules describe a similar relationship among two or more resources. For example, if one inference rule associates "attachmentOn" as an inverse relationship of a "hasAttachment" relationship between two resources, while another inference rule associates "attachedTo" as an inverse relationship of a "hasAttachment" relationship, "attachmentOn" and "attachedTo" may be determined to conflict. In another example, a conflict may occur between inference rules that determine characteristics of a resource based upon a resource's properties (e.g., its contents, relationships with other resources, etc.). As an example, if one resource is determined to be an "Email" by one inference rule, but is determined to be a "Message" by another inference rule, the two inference rules may be determined to conflict. In some examples, a conflict may be determined to exist among rules within one inference ruleset (e.g., a plurality of inference rules may conflict within the first isolated collection or within the second isolated collection).

When generating the third inference ruleset, conflicts between a first and second conflicting inference rule may be resolved using a variety of techniques. In one example, one of the first and second inference rules may be selected for inclusion in the third inference ruleset. In another example, neither the first nor the second inference rule may be included in the third inference ruleset. Alternatively, both the first and second inference rules may be included in the third inference ruleset. In some examples, a third inference rule may be created based one or more inference rules from the first and second inference ruleset. The third inference rule may be included in the third inference ruleset in addition to or as an alternative to the inference rules from the first and second inference ruleset on which it was based.

The overlay process may occur automatically wherein the third isolated collection and associated third inference ruleset are generated without further intervention. Conflicts may be resolved based on a previous preference indication. The previous preference indication may comprise an indication that conflicting rules should be omitted, a subset of the conflicting rules should be included, or all conflicting rules should be included. In one example, a preference indication may be specifically tailored to target a specific subset of inference rules (e.g., include any inference rules relating to resources of type "Email" while ignoring inference rules relating to type "Message"). One of skill in the art will appreciate that other kinds of conflict resolution preferences may be indicated without departing from the spirit of this disclosure.

In another example, a graphical user interface (GUI) may provide a graphical display of the overlay process. The GUI may graphically display resources within a first and second isolated collection, or a subset thereof. The subset may contain resources or relationships which are directly or indirectly related to one or more resources common to both the first and second isolated collection. The display may also include asserted or inferred relationships between the displayed resources. The GUI may use different visual indications for asserted relationships and inferred relationships in order to distinguish between them. For example, an asserted relationship may be displayed using a solid line or arrow, whereas an inferred relationship may be displayed using a dashed line or arrow. In one example, different colors or line weights may be used to differentiate between graphical representations of asserted relationships and inferred relationships. In some examples, the resources and/or relationships of the first isolated collection may be displayed alongside the resources and/or relationships of the second isolated collection. In another example, the resources and/or relationships of each isolated collection may be overlaid, such that at least one of the common resources within each isolated collection occupies a similar region of the display. A common resource may be emphasized on the display (e.g., using a different color scheme, displaying an outline, among other visual cues).

The GUI may also display a first and second inference ruleset associated with the first and second isolated collection, respectively. In an example, a subset of the inference rulesets may be displayed. The subset may be comprised of inference rules related to the one or more common resources. The inference rulesets may be used to display inferred relationships between the displayed resources. In an example, the display may be interactive, wherein varying inference rules may be selected and, as a result, the associated inferred relationships may be displayed or emphasized, or vice versa.

The GUI may display one or more suggestions relating to the resources, the inference rules, and/or the inferred relationships. These suggestions may relate to resolving conflicts between the first inference ruleset and the second inference ruleset. As an example, the GUI may display a plurality of conflicting inference rules along with one or more suggestions. The suggestions may comprise selecting a subset of the plurality of conflicting inference rules (e.g., none, some, or all of the rules) or generating a new inference rule based on the plurality of conflicting inference rules, among others. Inferred relationships relating to the one or more suggestions may be graphically displayed, thereby providing an indication as to what effect selecting a suggestion may have on the isolated collection.

As a result of the indications provided using the GUI, a third isolated collection and associated third inference ruleset may be generated. The third isolated collection may comprise resources and relationships which were displayed by the GUI, or a subset thereof. In some examples, the third isolated collection may comprise all of the resources and relationships contained within the first and second isolated collection, or a subset thereof. A subset may comprise those resources and relationships which are directly or indirectly related to one or more resources common to both the first and second isolated collection. In some examples, the relationships used to generate the third isolated collection may comprise only asserted relationships, as the inferred relationships may later be generated using the third inference ruleset.

The third inference ruleset may also be generated based on indications received via a GUI. As an example, an indication may include a selection of one or more suggestions, as discussed above. The indications may then be used to process the first and second inference rulesets accordingly, thereby generating the third inference ruleset. The third inference ruleset may be associated with the third isolated collection. In some examples, the third inference ruleset may be further processed to generate and store the inferred relationships within the third isolated collection. In another example, the inferred relationships may instead be dynamically generated at a later time, for example in response to an event (e.g., an access request, the execution of a scheduled operation, etc.).

FIG. 1 illustrates an overview of an example system for overlaying isolated collections of resources and relationships as described herein. Example system 100 may be a combination of interdependent components that interact to form an integrated whole for performing delegated authentication. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 8-11. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various data sets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below. Generally, the datasets are stored on one or more server devices 106A-C and are accessible by the client devices 102A-C. In some examples, however, the datasets may be at least partially stored on one or more of the client devices 102A-C The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to interrogate data stores comprising the resources corresponding to the resource identifiers in the various data sets. In examples, client devices 102A-C may interrogate content providers, such as server device 102A-C, via distributed network 104. The interrogation may include identifying the remote device on which a resource is located, and/or determining whether the remote device (or a service/separate remote device) has authenticated access to the resource. If access to the resource has been authenticated, client devices 102A-C may retrieve an authentication indication from the remote device. Client devices 102A-C may use the authentication indication to provide access to one or more of the various datasets comprising the corresponding resource identifier.

Server devices 106A-C may be configured to store and/or provide access to one or more resources. For example, server device 102A may be a web server, server device 102B may be a device comprising a collaborative messaging tool and a calendaring application, and server device 102C may be electronic mail server. Each of these devices may comprise a repository of resources that is accessible via one or more authentication mechanisms. In examples, server devices 106A-C may perform or monitor the authentication process when a request for a resource is received. If the authentication is successful, the authenticating device may store or maintain an authentication indication for a specified period of time. When the period of time expires, server devices 106A-C may remove or attempt to renew the authentication indication. In examples, server devices 106A-C may provide the authentication indication to an interrogating client device. In some aspects, server devices 106A-C may further be configured to store at least a portion of the various data sets and graphical representations, as discussed above.

Figure 2:
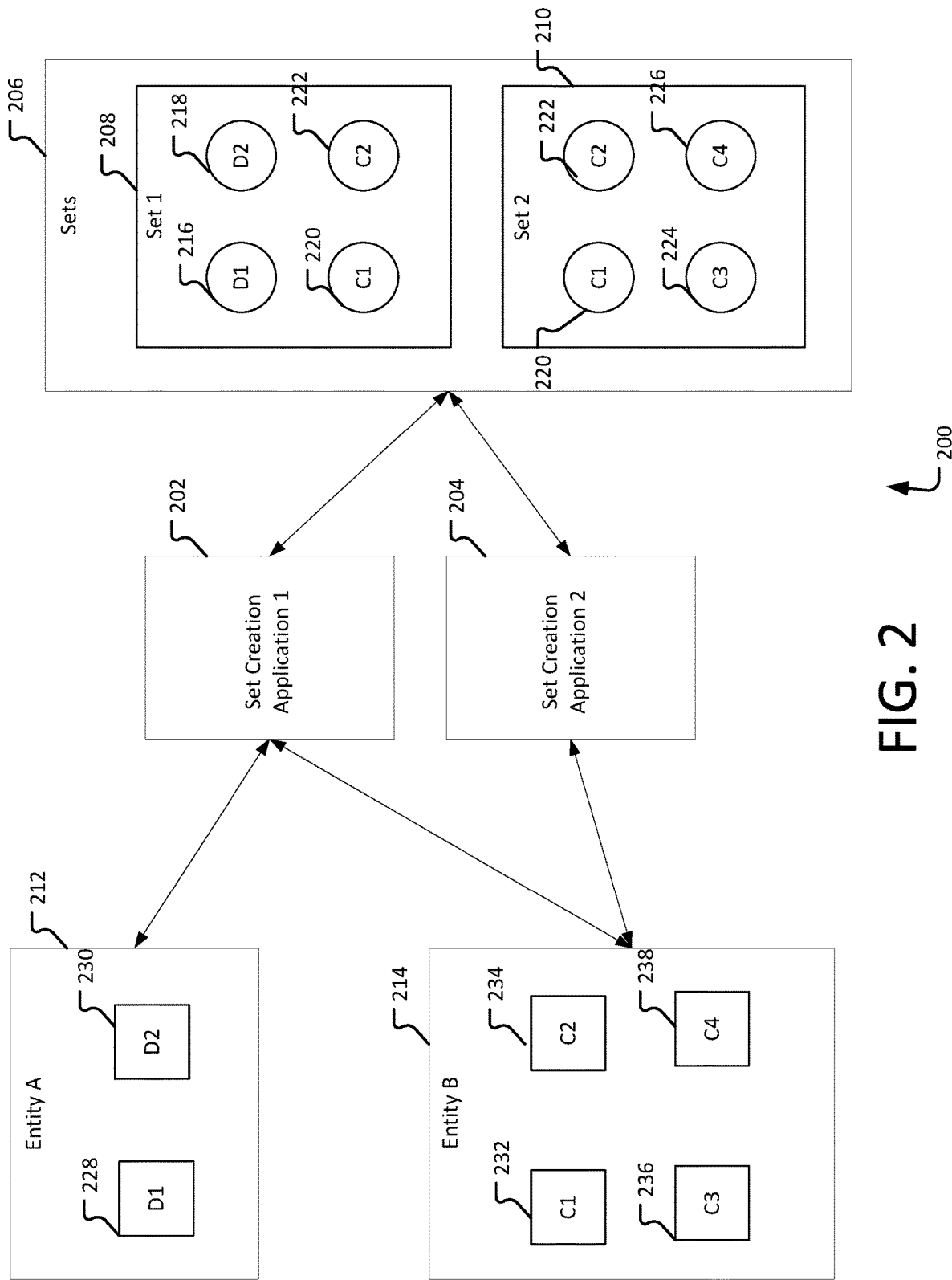
FIG. 2 illustrates an overview of an example system for managing isolated collections of resource identifiers and corresponding relationships.

FIG. 2 illustrates an overview of an example system 200 for managing isolated collections of resource identifiers and corresponding relationships. The isolated collection techniques implemented in system 200 may comprise or be associated with one or more of the delegated authentication techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define collections of relationships between resources (e.g., people, files, tasks, mail, documents, calendar events, etc.) and executing queries on those collections. Set creation applications 202 and 204 may further provide for defining and storing rulesets used to infer one or more relationships in the collections, and displaying graphical representations of the collection data. The defined rulesets may be stored in the Set itself, and in some examples is stored as metadata within the Set. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be co-located with a Set creation application, or environment 206 may be located remotely from the Set creation application. Environment 206 may provide access to one or more data collections, such as Sets 208 and 210. In examples, access to the data collections may be determined using one or more sets of permissions generated and/or maintained by Set creation applications 202 and 204. The sets of permissions may be different across one or more of the data collections. As a result, one or more of the data collections (or functionality associated therewith) may not be accessible from one or more of Set creation applications 202 and 204.

Sets 208 and 210 may respectively comprise isolated collections of asserted resource identifiers and corresponding relationships. The relationships in the isolated collections may be defined manually or may be automatically derived using one or more rulesets. The isolated collections may be represented using graphical structures that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource, but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation 2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238. In some aspects, resource providers 212 and 214 may be accessible by Set creation applications 202 and 204. Set creation applications 202 and 204 may access resource providers 212 and 214 to determine the existence of resources and/or retrieve information associated with the resources (e.g., resource metadata, resource location, resource identifiers, permission sets, authentication data, etc.). The information retrieved from resource providers 212 and 214 may be used to determine a set of resource identifiers corresponding to one or more of the available resources. The set of resource identifiers may be used to create one or more isolated collections of asserted resource identifiers and corresponding relationships. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authentication and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
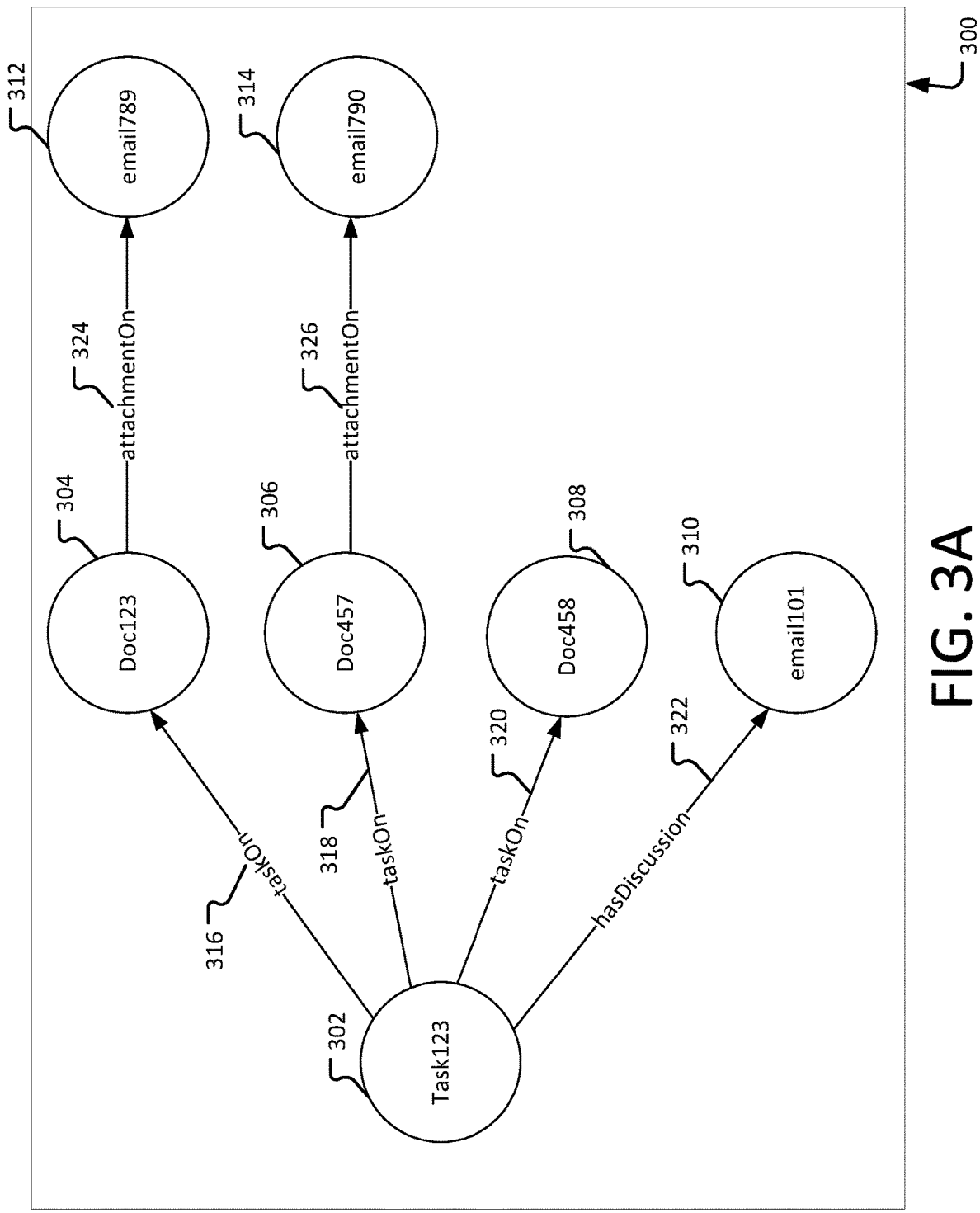
FIG. 3A illustrates an overview of an example isolated collection.

FIG. 3A illustrates an example isolated collection 300 of asserted resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rulesets that may include rules defined in accordance with Semantic Web technologies, such as resource description framework (RDF), RDF schema (RDFS), SPARQL Protocol and RDF Query Language (SPARQL), Web Ontology Language (OWL), etc. For example, collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a developer through a Sets creation application. For instance, a developer may manually add each of the resource identifiers and the relationships between the resource identifiers. As an example, the developer may manually indicate that the "task123" is a task on "Doc123," as represented in the collection 300 by the "taskOn" relationship 316. The resource identifiers and relationships may also be asserted by an external bot or application created by a developer. For instance, an add-in may be programmed to monitor activity in a browser or other application to track usage of the application. Based on the usage of the application, the add-in sends additional resources and relationships to be included in the collection 300.

In contrast to the asserted resource identifiers and relationships, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below.

Isolated collection 300 further depicts that resource identifier 302 is associated with resource identifiers 304, 306 and 308 and resource identifier 310. The collection creation utility may determine that the resource identifier 302 represents a task to be performed on identifiers 304, 306, and 308. Based on this determination, the collection creation utility may assign relationships 316, 318 and 320 (e.g., "taskOn") to define the association between resource identifier 302 and resource identifier 304, 306 and 308. In other examples, the relationships 316, 318, and 320 may be asserted, as discussed above. Additional relationships, such as the "hasDiscussion" relationship 322 may have been asserted manually by a developer or asserted from an add-in of an e-mail application that analyzed the content of e-mail 101. While specific types of resources and relationships are described in FIG. 3A, one of skill in the art will appreciate that other types of resources and/or relationships may be included in an isolated collection without departing from the spirit of this disclosure.

FIGS. 3B-3E illustrate an example query model that may be used to traverse collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as collection 300. For example, the entire collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http:// . . . /collection300/task123' may be executed against collection 300. The query results may comprise resource identifier 302 and be visualized as illustrated in FIG. 3B. In FIG. 3C, the query has been amended to 'http:// . . . /collection300/task123?$expand=taskOn' and executed against collection 300. The query results may comprise resource identifiers 302, 304, 306 and 308 and relationships 316, 318 and 320, and be visualized as illustrated in FIG. 3C. In FIG. 3D, the query has been amended to 'http:// . . . /collection300/task123?$expand=taskOn ($expand=attachmentOn)' and executed against collection 300. The query results may comprise resource identifiers 302, 304, 306, 308, 312 and 314 and relationships 316, 318, 320, 324 and 326, and be visualized as illustrated in FIG. 3D. In FIG. 3E, the query has been amended to http:// . . . /collection300/task123?$expand=task-On($expand=attachmentOn($filter=Subject eq 'Sets'))' and executed against collection 300. As only resource identifier comprises 314 the subject "Sets", the query results may comprise resource identifiers 302, 306 and 314 and relationships 318 and 326, and be visualized as illustrated in FIG. 3E.

Figure 4:
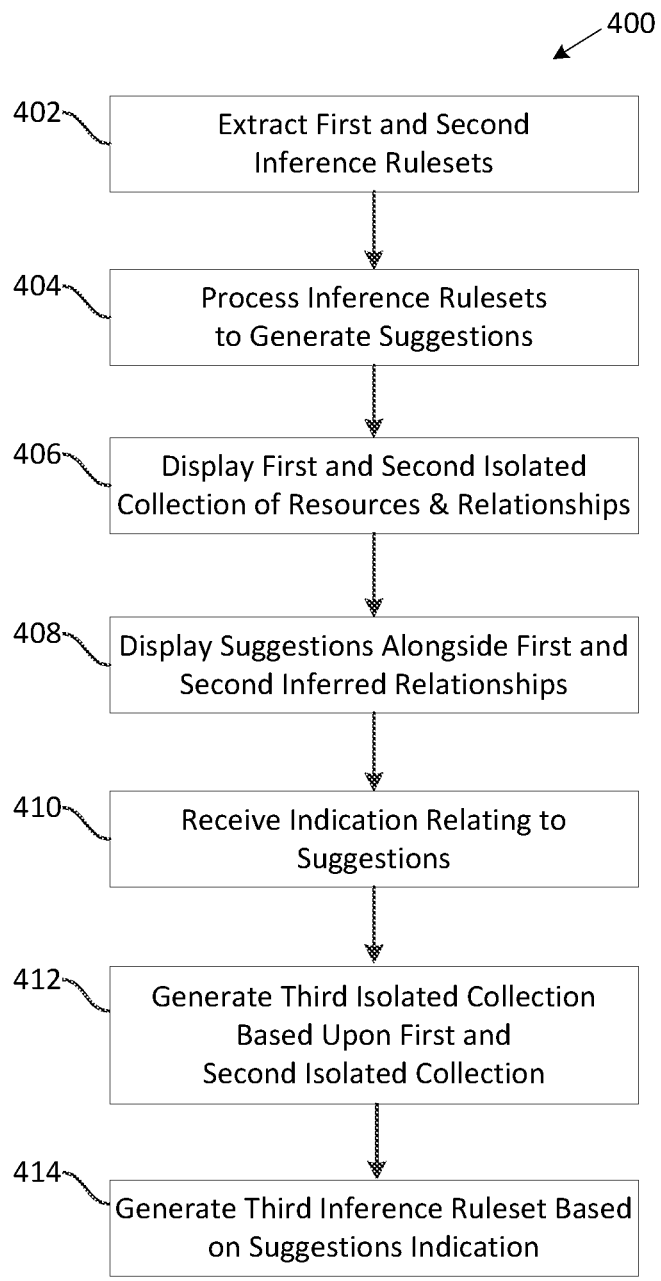
FIG. 4 illustrates an overview of an example method for generating an inference ruleset by overlaying two isolated collections.

FIG. 4 illustrates an overview of an example method 400 for generating an inference ruleset by overlaying two isolated collections. At operation 402, a first inference ruleset and a second inference ruleset may be extracted. Extracting an inference ruleset may comprise retrieving the inference ruleset based on an association with an isolated collection. In some examples, the inference ruleset may be stored remotely or may be stored locally with the isolated collection (e.g., on the same storage system as the isolated collection, as metadata associated with the isolated collection, etc.).

At operation 404, the first and second inference rulesets may be processed, thereby generating one or more suggestions. In some examples, a suggestion may comprise an action to resolve a conflict among a plurality of inference rules within the first and second inference rulesets. A conflict may occur when a plurality of inference rules describe a similar relationship between two or more resources. In another example, a conflict may occur between inference rules that determine characteristics of a resource based upon a resource's properties (e.g., its contents, relationships with other resources, etc.). Conflicts may also be determined to exist among rules within one inference ruleset (e.g., a plurality of inference rules may conflict within the first isolated collection or within the second isolated collection). Example suggestions may include selecting a subset of the plurality of conflicting inference rules (e.g., none, some, or all of the rules) or generating a new inference rule based on the plurality of conflicting inference rules, among others.

Moving to operation 406, the first and second isolated collection of resources and relationships may be displayed. The display may comprise the resources of the first isolated collection, the relationships of the first isolated collection, the resources of the second isolated collection, or the relationships of the second isolated collection, or some combination thereof. In one example, a subset of the resources or relationships comprising the first and second isolated collection may be displayed. The subset may contain resources or relationships that are directly or indirectly related to one or more resources common to both the first and second isolated collection. The display may also include asserted or inferred relationships between the displayed resources. In some examples, the resources and/or relationships of the first isolated collection may be displayed alongside the resources and/or relationships of the second isolated collection. In another example, isolated collections may be overlaid such that at least one of the common resources within each isolated collection occupies a similar region of the display. A common resource may be emphasized on the display (e.g., using a different color scheme, displaying an outline, among other visual cues).

At operation 408, suggestions may be displayed alongside the first and second inferred relationship. Displaying the first and second inferred relationship may comprise displaying the first and second inference ruleset in addition or alternative to the inferred relationships. In an example, a subset of the inference rulesets or inferred relationships may be displayed. The subset may be comprised of inference rules or inferred relationships related to the one or more common resources. In an example, the display may be interactive, wherein varying inference rules may be selected and, as a result, the associated inferred relationships may be displayed or emphasized, or vice versa. Further, the displayed suggestions may relate to resolving conflicts between the first inference ruleset and the second inference ruleset (as discussed above). A plurality of conflicting inference rules may be displayed along with one or more suggestions. The suggestions may comprise including a subset of the plurality of conflicting inference rules (e.g., none, some, or all of the rules) or generating a new inference rule based on the plurality of conflicting inference rules, among others. Inferred relationships relating to the one or more suggestions may be graphically displayed, thereby providing an indication as to what effect selecting a suggestion may have on the overlaid isolated collection.

Continuing to operation 410, an indication may be received relating to the displayed suggestions. In an example, the indication may comprise a selection of one or more suggestions. The indication may be received from a user (e.g., an end user, a system administrator, etc.) via a GUI. In some examples, the indication may also comprise a selection of a plurality of resources and/or relationships. In some examples, the selection may comprise an indication of resources or relationships to include in a new isolated collection, or resources or relationships to omit from a new isolated collection. In another example, the indication may comprise a selection that the third isolated collection and associated third inference ruleset should be generated automatically. Conflicts may be resolved based on a previous preference indication. The previous preference indication may comprise an indication that conflicting rules should be omitted, a subset of the conflicting rules should be included, or all conflicting rules should be included. In one example, a preference indication may be specifically tailored to target a specific subset of inference rules (e.g., include any inference rules relating to resources of type "Email" while ignoring inference rules relating to type "Message").

At operation 412, a third isolated collection may be generated based on the first and second isolated collection. The third isolated collection may comprise the resources and relationships that were displayed, or a subset thereof. In some examples, the third isolated collection may comprise all of the resources and relationships contained within the first and second isolated collection, or a subset thereof. A subset may comprise those resources and relationships which are directly or indirectly related to one or more resources common to both the first and second isolated collection. In some examples, the relationships used to generate the third isolated collection may comprise only asserted relationships, as the inferred relationships may later be generated using the third inference ruleset. In an example, information contained within the indication received at operation 410 may also be evaluated when generating the third isolated collection (e.g., a selection of resources or relationships to explicitly include or omit from the third isolated collection).

Flow terminates at operation 414, where the third inference ruleset may be generated based upon the suggestions indication received at operation 410. The third inference ruleset may be associated with the third isolated collection. In some examples, the third inference ruleset may be stored remotely or may be stored locally with the third isolated collection (e.g., on the same storage system as the isolated collection, as metadata associated with the isolated collection, etc.).

Figure 5:
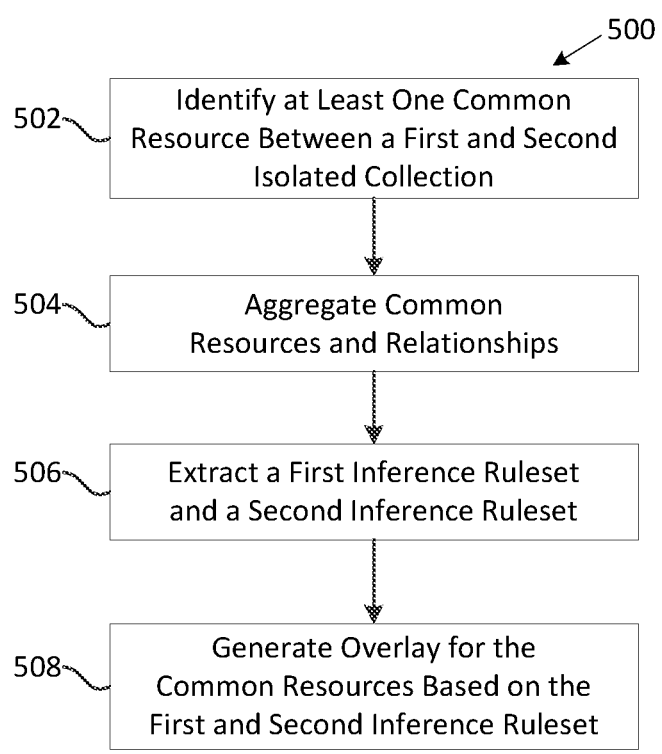
FIG. 5 illustrates an overview of an example method for overlaying a first and second isolated collection.

FIG. 5 illustrates an overview of an example method 500 for overlaying a first and second isolated collection. At operation 502, at least one common resource may be identified between a first and second isolated collection. Identifying a common resource may comprise evaluating the contents, attributes, or properties of a plurality of resources, among other characteristics, to determine whether the resources match. In other examples, identifying a common resource may comprise evaluating an associated resource identifier to determine whether the resource identifiers are equal, or whether they are associated with or refer to the same resource or the same resource location. Identifying the location of a resource may include parsing the resource identifier using, for example, regular expressions, providing one or more portions of the resource identifier to a search utility, executing the resource identifier, etc. In other examples, an exact match may not be required and common resource identification may instead be based on a determination that two resources are substantially similar (e.g., where each resource is a different versions of the same document, the resources may be determined to be substantially the same).

Moving to operation 504, common resources and relationships may be aggregated. Common resources and relationships may be aggregated in order to better understand the extent and scope of the commonality between the first and second isolated collection. Aggregation may comprise isolating, storing, or selecting common resources and/or relationships from the first and second isolated collection. In other examples, aggregating may further include resources and/or relationships which are indirectly related to or associated with the common resources and relationships. In some examples, indirect associations may be limited based on proximity to the resource (e.g., how closely related the two resources are).

At operation 506, a first and second inference ruleset may be extracted. Extracting an inference ruleset may comprise retrieving the inference ruleset based on an association with an isolated collection. In some examples, the inference ruleset may be stored remotely or may be stored locally with the isolated collection (e.g., on the same storage system as the isolated collection, as metadata associated with the isolated collection, etc.). In some examples, a subpart of one or more of the inference rulesets may be extracted, where the extracted subpart is associated with the aggregated common resources and relationships.

Flow terminates at operation 508, where an overlay may be generated for the common resources based on the first and second inference ruleset. Generating the overlay may comprise generating a third isolated collection containing the aggregated common resources and relationships, as well as generating a third inference ruleset based on the first and second inference ruleset. This is discussed in further detail above with respect to FIG. 4.

FIG. 6A illustrates an overview of example isolated collection 602 having a plurality of asserted resource identifiers and relationships. As depicted in visual representation 602A, isolated collection 602 includes resource identifier 608 representing a resource of type "Email" 616A, and resource identifier 610 representing an attachment to resource identifier 608. Relationship 612 uses a solid arrow to indicate that an asserted relationship of "hasAttachment" exists between resource identifier 608 and resource identifier 610. Relationship 612 is directional in that it indicates that resource identifier 608 has an attachment of resource identifier 610, rather than the other way around. Similarly, relationship 614 uses a dashed arrow to indicate that an inferred relationship of "attachmentOn" exists between resource identifier 610 and resource identifier 608. Relationship 614 is directional in that it indicates that resource identifier 610 is an attachment on resource identifier 608, rather than the other way around.

Rules 602B may be used to describe isolated collection 602 and to generate visual representation 602A. The first rule, "A hasAttachment B," is an asserted relationship, which is visualized by relationship 612 between resource identifier 608 and resource identifier 610. The two remaining rules, "A is Email" and "attachmentOn inverseOf hasAttachment," may be inferred rules which may reside in an inference ruleset, displayed as type "Email" 616A and relationship 614, respectively.

FIG. 6B illustrates an overview of example isolated collection 604. Isolated collection 604 is similar to isolated collection 602, in that it is comprised of resource identifiers 608 and 610, which are related by "hasAttachment" relationship 612. As depicted in visual representation 604A, isolated collection 604 includes resource identifier 608 representing a resource of type "Message" 616B, and resource identifier 610 representing an attachment to resource identifier 608. Relationship 612 uses a solid arrow to indicate that an asserted relationship of "hasAttachment" exists between resource identifier 608 and resource identifier 610. Relationship 612 is directional in that it indicates that resource identifier 608 has an attachment of resource identifier 610, rather than the other way around. Similarly, relationship 618 uses a dashed arrow to indicate that an inferred relationship of "attachedTo" exists between resource identifier 610 and resource identifier 608. Relationship 614 is directional in that it indicates that resource identifier 610 is attached to resource identifier 608, rather than the other way around.

Rules 604B may be used to describe isolated collection 604 and to generate visual representation 604A. The first rule, "A hasAttachment B," is an asserted relationship, which is visualized by relationship 612 between resource identifier 608 and resource identifier 610. The two remaining rules, "A is Message" and "attachedTo inverseOf hasAttachment," may be inferred rules which may reside in an inference ruleset, displayed as type "Message" 616B and relationship 618, respectively.

FIG. 6C illustrates an overview of overlaying two isolated collections 602 and 604. Isolated collection 606 is similar to isolated collections 602 and 604, in that it is comprised of resource identifiers 608 and 610, which are related by "hasAttachment" relationship 612. However, as is visible in visual representation 602A, the inferred relationships (e.g., "attachmentOn" relationship 614 and "attachedTo" relationship 618) from isolated collections 602 and 604 have been overlaid to form isolated collection 606. Additionally, type 616C has not been definitively resolved to be either "Email" or "Message."

Rules 608B illustrates the rule conflicts that arise as a result of overlaying isolated collections 602 and 604 to create isolated collection 606. "A hasAttachment B" is not a conflict because it was present and has remained unchanged in both rules 602B and 604B. By contrast, all remaining rules (e.g., "A is Email," "A is Message," "attachmentOn inverseOf hasAttachment," and "attachedTo inverseOf hasAttachment") conflict because they describe similar relationships. As a result, a selection may be made to indicate that neither, one, or both rules should remain associated with isolated collection 606. While specific examples of resources, rules, and relationships are depicted in FIGS. 6A, 6B, and 6C, one of skill in the art will appreciate that the systems and methods disclosed herein may be employed with any type of resources, rules, and relationships. As such, the specific resources, rules, and relationships disclosed herein are provided for exemplary purposes and should not be construed as limiting the scope of this disclosure.

Figure 7:
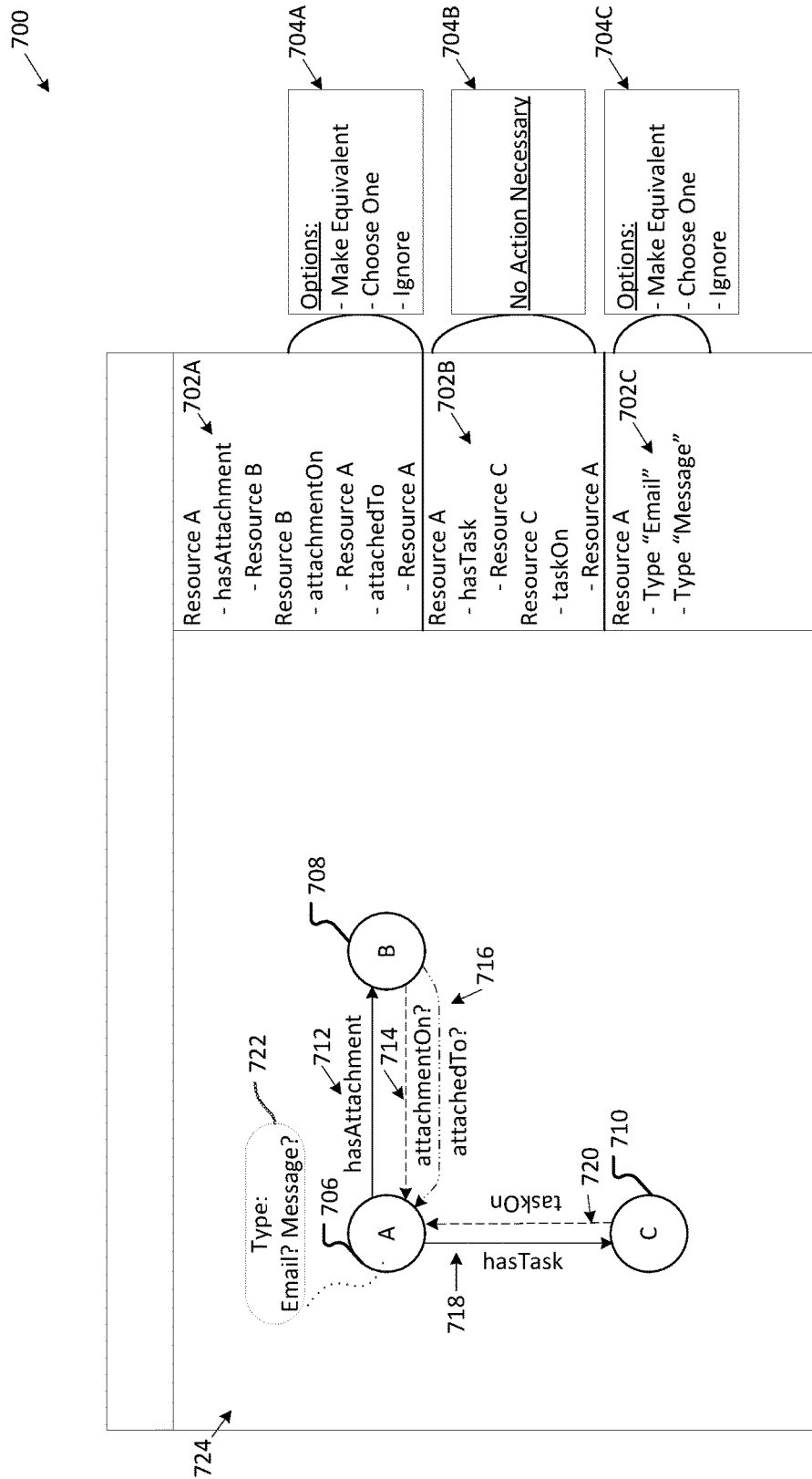
FIG. 7 illustrates an overview of an example isolated collection overlay interface.

FIG. 7 illustrates an overview of an example isolated collection overlay interface 700. Isolated collection overlay interface 700 is comprised of isolated collection view 724, rule views 702A-702C, and option lists 704A-704C. Isolated collection view 724 may graphically display resources and/or relationships contained within a first and second isolated collection, or a subset thereof. The subset may contain resources or relationships which are directly or indirectly related to one or more resources common to both the first and second isolated collection. Rule views 702A-702C may display the contents of one or more inference rulesets associated with the overlaid collections. Option lists 704A-704C may contain one or more suggestions relating to the displayed resources, the inference rules, and/or the inferred relationships. These suggestions may relate to resolving conflicts between the inference rulesets associated with the overlaid isolated collections.

As pictured, isolated collection view 724 visualizes an overlaid isolated collection comprising resource identifier 706 ("Resource A") which represents a resource of type "Email" or "Message" 722, resource identifier 708 ("Resource B") which may be an attachment, and resource identifier 710 ("Resource C") which may be a task. Relationship 712 uses a solid arrow to indicate that an asserted relationship of "hasAttachment" exists between resource identifier 706 and resource identifier 708. Relationship 712 is directional in that it indicates that resource identifier 706 has an attachment of resource identifier 708, rather than the other way around. Similarly, relationships 714 and 716 use dashed arrows to indicate that inferred relationships of "attachmentOn" and "attachedTo", respectively, exist between resource identifier 708 and resource identifier 706. Relationships 714 and 716 are directional in that they indicate that resource identifier 708 is an attachment on or an attachment to, respectively, resource identifier 706, rather than the other way around.

Additionally, relationship 718 uses a solid arrow to indicate that an asserted relationship of "hasTask" exists between resource identifier 706 and resource identifier 710. Relationship 718 is directional in that it indicates that resource identifier 706 has a task of resource identifier 710. Relationship 720 uses a dashed arrow to indicate that inferred relationship "taskOn" exists between resource identifier 710 and resource identifier 706. Relationship 720 is directional in that it indicates that resource identifier 710 is a task on resource identifier 706.

Rule views 702A-702C display a textual representation of the isolated collection and the associated rulesets. Rule view 702A displays rules relating to the relationship between resource identifier 706 (e.g., Resource A) and resource identifier 708 (e.g., Resource B). Relationships 714 and 716 (e.g., "attachmentOn" and "attachedTo") are determined to conflict because they describe a similar inference rule with respect to the relationship between resource identifier 708 and resource identifier 706. As a result, options list 704A may present options that permit a user to make a selection, including making the relationships equivalent (e.g., include both relationships), selecting one of the two conflicting relationships, or ignoring both rules, thereby omitting both relationships from the resulting overlay collection.

By contrast, rule view 702B contains no conflicts, as there is only one inferred relationship between resource identifier 710 and resource identifier 706. As a result, options list 704B may contain no options. With respect to rule view 702C, conflicting inference rules relating to type 722 of resource identifier 706 are listed. This is because one isolated collection contained an inference rule that categorized resource identifier 706 as a type of "Email," while the other inference rule categorized resource identifier as a type of "Message." As such, options list 704C displays suggestions for resolving conflicts to type 722 of resource identifier 706. Options may include selecting both inference rules (e.g., "Make Equivalent"), selecting one of the inference rules, or selecting neither inference rule.

In some examples, isolated collection view 724 may update its display in reaction to indications received by rule views 702A-702C and options lists 704A-704C. As an example, an inferred relationship (e.g., relationship 714) may be emphasized as the result of interacting with options list 704A (e.g., hovering over "Make Equivalent," "Choose One," or "Ignore"). In another example, conflicting relationships may be graphically deemphasized or hidden from the display, in order to enable a user to visualize what the composition of the overlaid isolated collection would look like if they were to select a specific contained in option lists 704A-704C. Similarly, a visual representation of a rule listed in rule views 702A-702C may be emphasized in response to interaction with the rules listed in rule views 702A-702C. For example, when hovering or clicking on "hasTask," in rule view 702B, relationship 718 may be emphasized in isolated collection view 724. While specific examples of resources, rules, and relationships are depicted in FIG. 7, one of skill in the art will appreciate that the systems and methods disclosed herein may be employed with any type of resources, rules, and relationships. As such, the specific resources, rules, and relationships disclosed herein are provided for exemplary purposes and should not be construed as limiting the scope of this disclosure.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
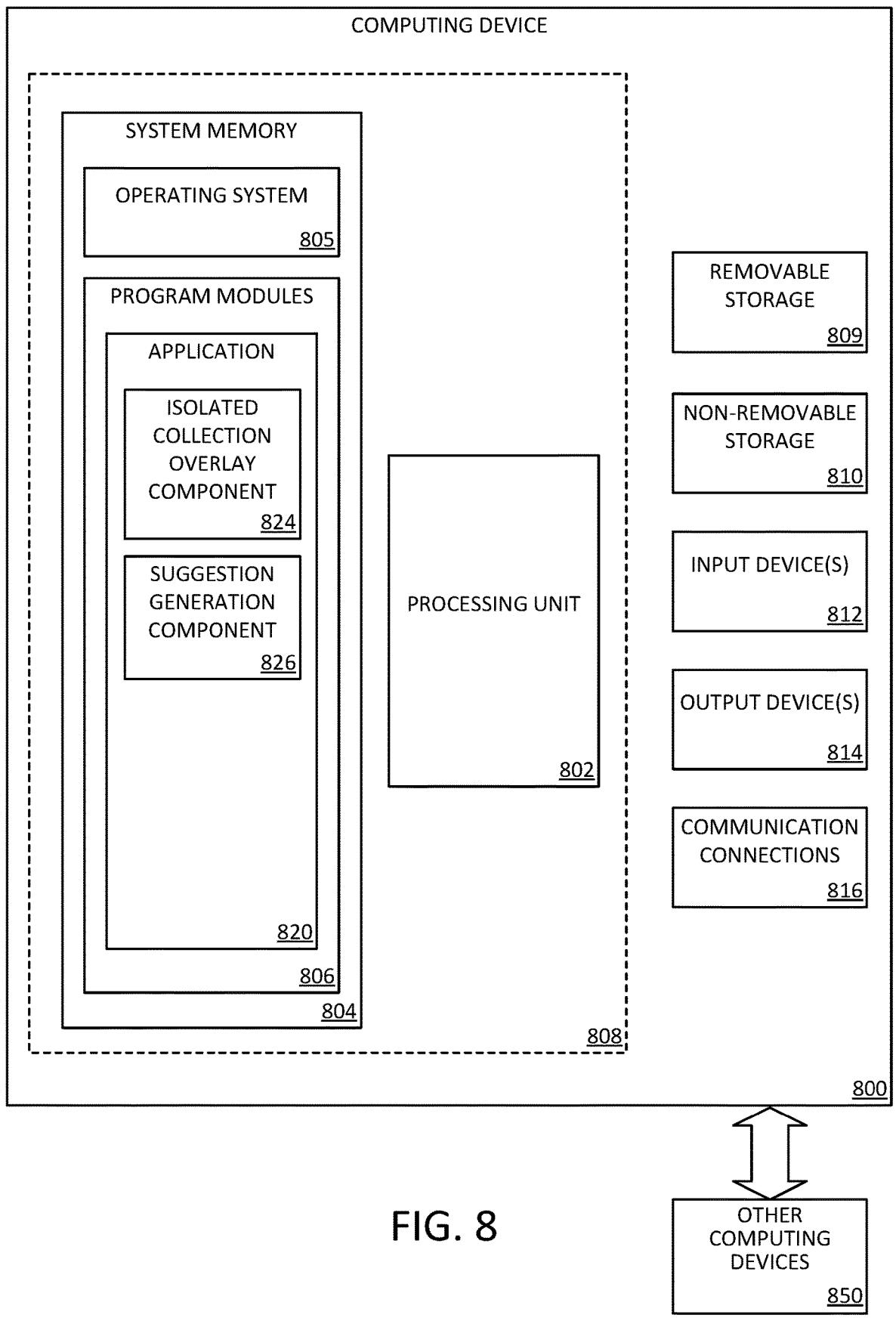
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above, including the client computing devices 102A-C and the server computing devices 106A-C. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for performing the various aspects disclosed herein such as a isolated collection overlay component 824 and suggestion generation component 826. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
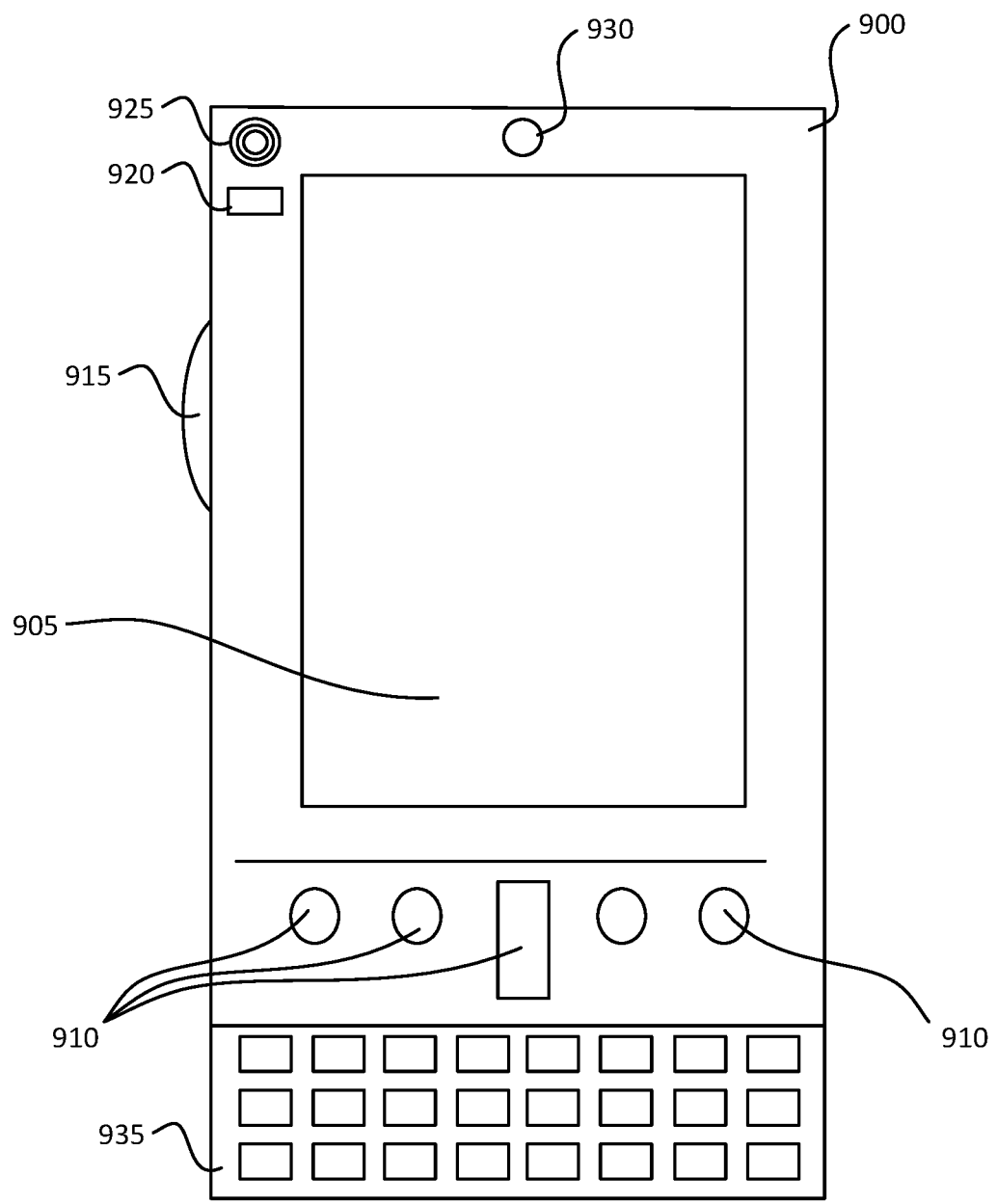
FIGS. 9A and 9B are simplified block diagrams of a mobile computing device with which aspects of the present disclosure may be practiced.
Figure 9B:
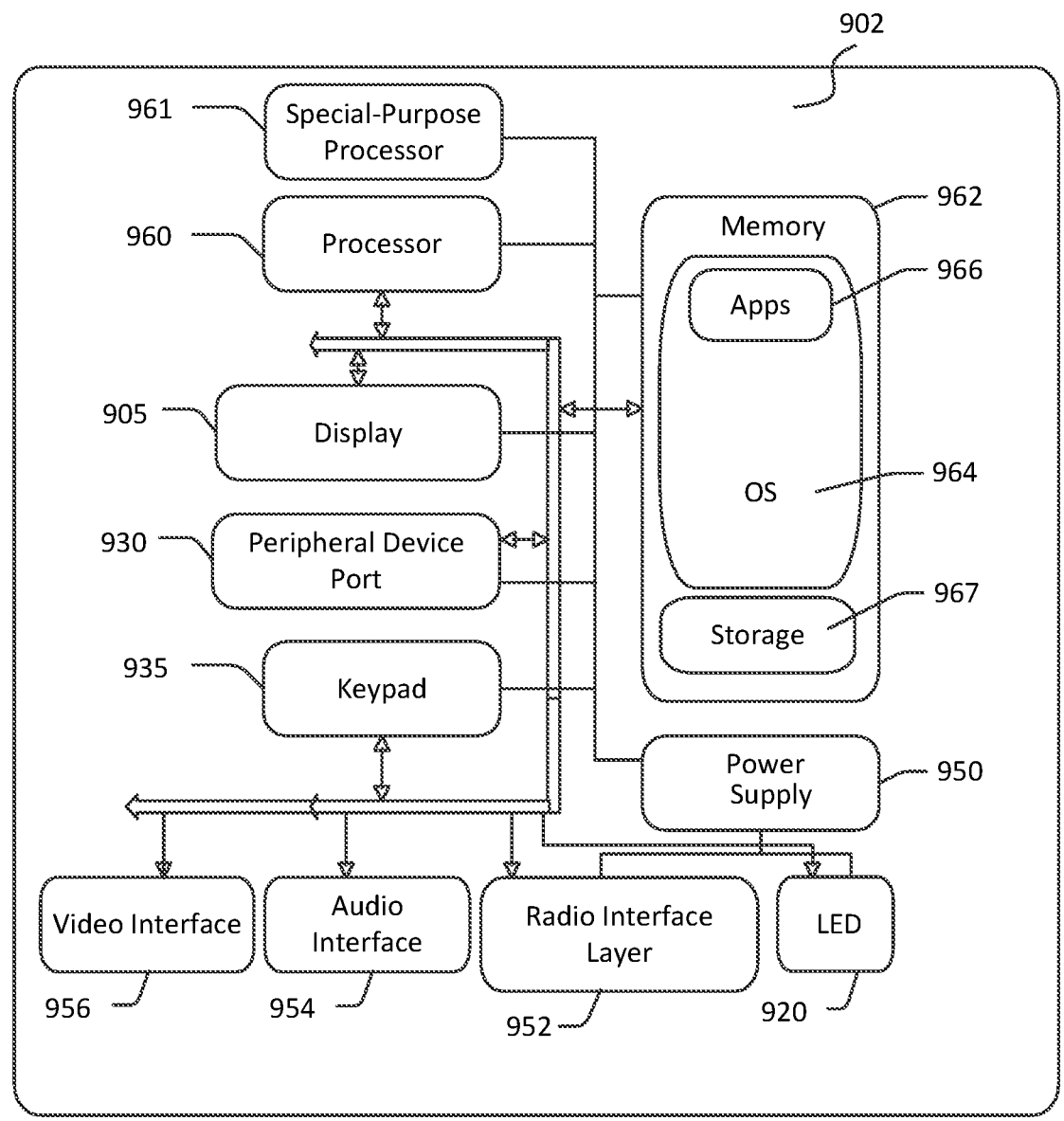

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
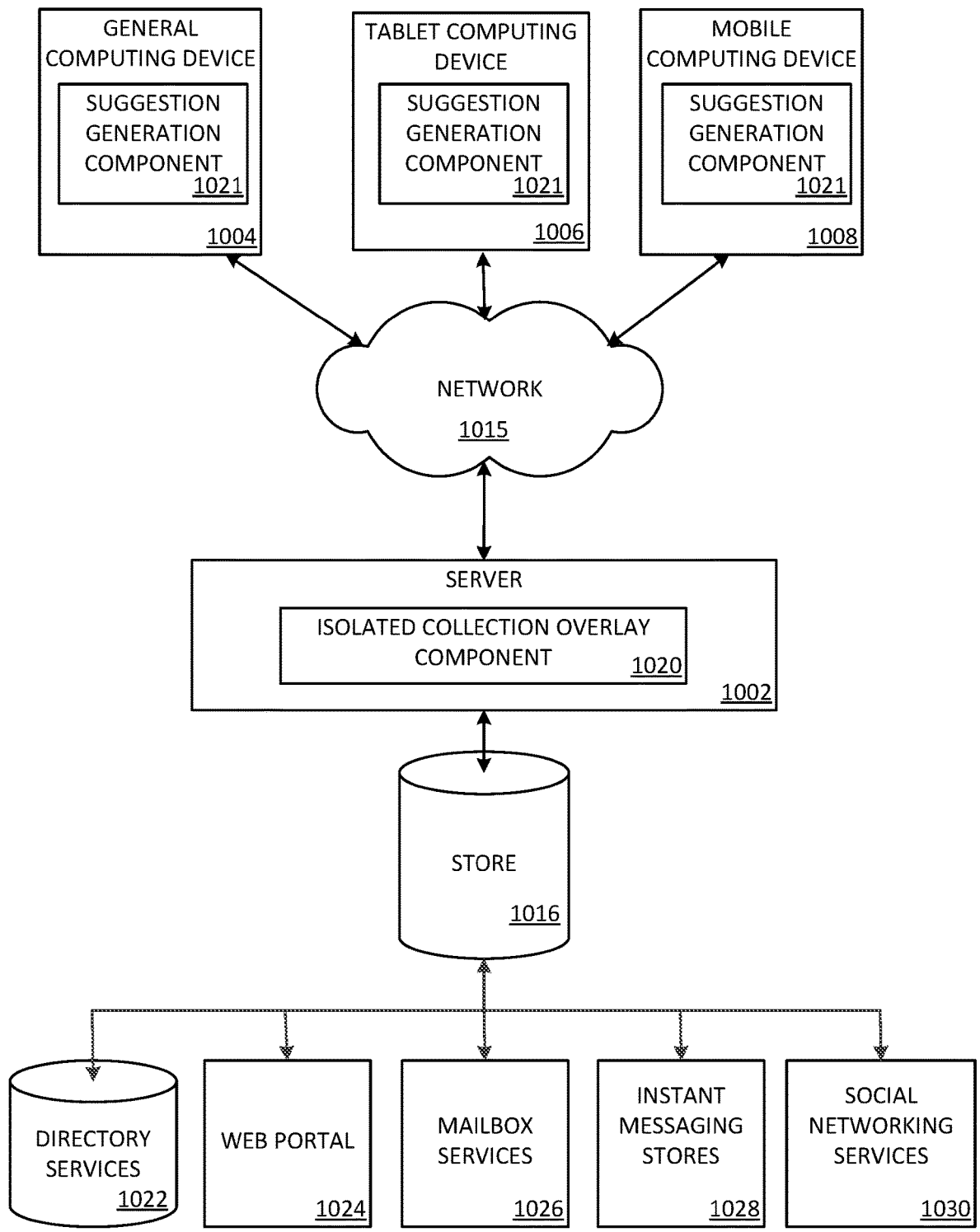
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. Suggestion generation component 1021 may be employed by a client that communicates with server device 1002, and/or isolated collection overlay component 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Figure 11:
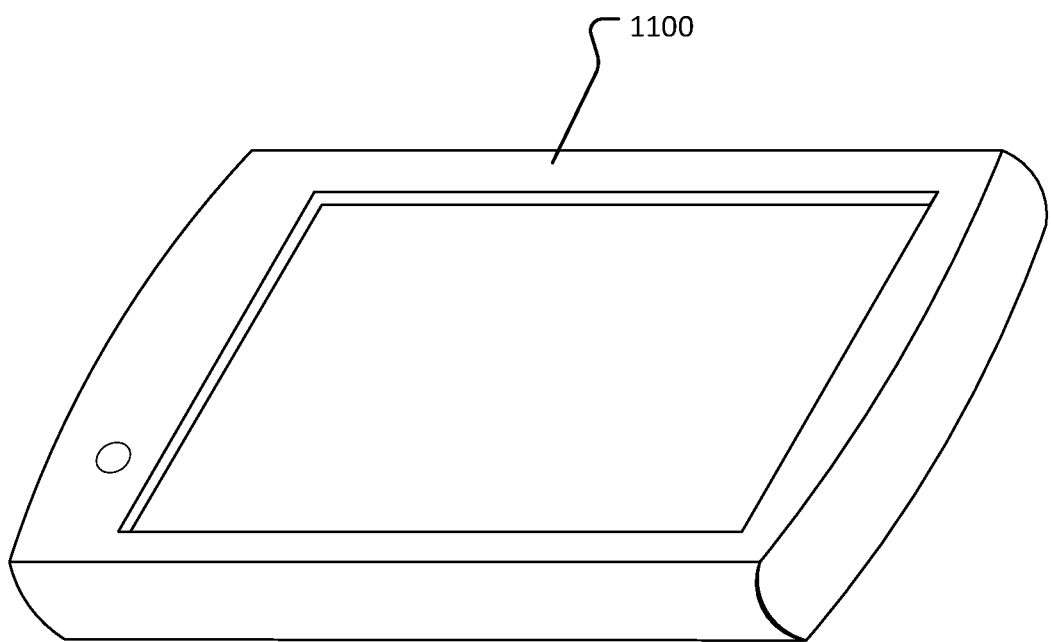
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and a memory storing instructions that when executed by the at least one processor perform a set of operations. The operations comprise accessing a first isolated collection of resources and asserted relationships, and a second isolated collection of resources and asserted relationships, wherein the first and second isolated collection comprise at least one common resource; extracting a first inference ruleset from the first isolated collection; extracting a second inference ruleset from the second isolated collection; processing the first inference ruleset and the second inference ruleset to generate one or more suggested operations; displaying the one or more suggested operations in conjunction with the first isolated collection, the second isolated collection, a first plurality of inferred relationships associated with the first inference ruleset, and a second plurality of the inferred relationships associated with the second inference ruleset; receiving a selection relating to at least one of the one or more suggested operations; based on the received selection, generating a third inference ruleset; storing a third isolated collection comprising resources and asserted relationships from the first isolated collection and the second isolated collection, as well as a third plurality of inferred relationships based on the third inference rule set; and associating the third inference ruleset with the third isolated collection. In an example, the one or more suggested operations comprises selecting one of the one or more similar inference rules within the first inference ruleset and the second inference ruleset. In another example, the one or more suggested operations comprises selecting one or more similar inference rules within the first inference ruleset and the second inference ruleset. In yet another example, the one or more suggested operations comprises selecting neither of a first inference rule from the first inference ruleset and a second inference rule from the second inference ruleset, wherein the first inference rule and the second inference rule describe a similar relationship. In a further example, the one or more suggested operations comprises creating a third inference rule based on the one or more similar inference rules within the first inference ruleset and the second inference ruleset. In one example, receiving the selection comprises receiving an automatic indication based on a previous preference indication.

In another aspect, the technology relates to a computer-implemented method for overlaying isolated collections. The method comprises accessing a first isolated collection of resources and asserted relationships, and a second isolated collection of resources and asserted relationships; determining at least one common resource in the first and second isolated collection; identifying one or more resources or relationships within the first and second isolated collection relating to the at least one common resource; based on the determination, extracting a first inference ruleset from the first isolated collection and extracting a second inference ruleset from the second isolated collection; and generating an overlay of the at least one common resource, wherein generating the overlay comprises determining at least one relationship for the common resource using the first inference ruleset, and at least a second relationship using the second inference ruleset. In an example, the method further comprises: generating a third isolated collection comprising the one or more resources or asserted relationships relating to the at least one common resource; processing the first inference ruleset and the second inference ruleset to generate a third inference ruleset; and associating the third inference ruleset with the third isolated collection. In another example, processing the first inference ruleset and the second inference ruleset further comprises: determining that a first inference rule from the first inference ruleset describes a similar relationship between a plurality of resources as a second inference rule from the second inference ruleset; receiving a selection of either the first inference rule or the second inference rule; and adding the selected inference rule to the third inference ruleset.

In one example, processing the first inference ruleset and the second inference ruleset further comprises: determining that a first inference rule from the first inference ruleset describes a similar relationship between a plurality of resource identifiers as a second inference rule from the second inference ruleset; receiving a selection of both the first inference rule and the second inference rule; and adding the first inference rule and the second inference rule to the third inference ruleset. In yet another example, processing the first inference ruleset and the second inference ruleset further comprises: determining that a first inference rule from the first inference ruleset describes a similar relationship between a plurality of resource identifiers as a second inference rule from the second inference ruleset; receiving an indication that neither the first inference rule nor the second inference rule are selected; and adding neither the first inference rule nor the second inference rule to the third inference ruleset.

In a further example processing the first inference ruleset and the second inference ruleset further comprises: determining that a first inference rule from the first inference ruleset describes a similar relationship between a plurality of resource identifiers as a second inference rule from the second inference ruleset; receiving a selection that a third inference rule should be created based on the first inference rule and the second inference; in response to the indication, generating the third inference rule based on the first inference rule and the second inference rule; and adding the third inference rule to the third inference ruleset. In an example, processing the first inference ruleset and the second inference ruleset further comprises: determining that a first inference rule from the first inference ruleset describes a similar relationship between a plurality of resource identifiers as a second inference rule from the second inference ruleset; automatically making a further determination based upon a previous preference indication, wherein the further determination comprises selecting the first inference rule, selecting the second inference rule, selecting neither inference rule, or generating a third inference rule based on the first inference rule and the second inference rule; and updating the third inference rule set based upon the selection.

In another aspect, the technology relates to another computer-implemented method for overlaying isolated collections. The method comprises accessing a first isolated collection of resources and asserted relationships, and a second isolated collection of resources and asserted relationships, wherein the first and second isolated collection comprise at least one common resource; extracting a first inference ruleset from the first isolated collection; extracting a second inference ruleset from the second isolated collection; processing the first inference ruleset and the second inference ruleset to generate one or more suggested operations; displaying the one or more suggested operations in conjunction with the first isolated collection, the second isolated collection, a first plurality of inferred relationships associated with the first inference ruleset, and a second plurality of the inferred relationships associated with the second inference ruleset; receiving a selection relating to at least one of the one or more suggested operations; based on the received selection, generating a third inference ruleset; storing a third isolated collection comprising resources and asserted relationships from the first isolated collection and the second isolated collection, as well as a third plurality of inferred relationships based on the third inference rule set; and associating the third inference ruleset with the third isolated collection.

In an example, the one or more suggested operations comprises selecting one of the one or more similar inference rules within the first inference ruleset and the second inference ruleset. In another example, the one or more suggested operations comprises selecting one or more similar inference rules within the first inference ruleset and the second inference ruleset. In a further example, the one or more suggested operations comprises selecting neither of one or more similar inference rules within the first inference ruleset and the second inference ruleset. In one example, the one or more suggested operations comprises creating a third inference rule based on the one or more similar inference rules within the first inference ruleset and the second inference ruleset. In yet another example, receiving the selection comprises receiving an automatic indication based on a previous preference indication. In still yet another example, the one or more suggested operations comprises selecting one or more similar inference rules within the first inference ruleset and the second inference ruleset and creating a third inference rule based on the one or more similar inference rules.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   a memory storing instructions that when executed by the at least one processor perform a set of operations comprising:
      accessing a first isolated collection of resources and asserted relationships, and a second isolated collection of resources and asserted relationships, wherein the first and second isolated collection comprise at least one common resource;
      extracting a first inference ruleset from the first isolated collection;
      extracting a second inference ruleset from the second isolated collection;
      processing the first inference ruleset and the second inference ruleset to generate one or more suggested operations;
      displaying an overlay interface, the overlay interface comprising:
         an isolated collection view for displaying an overlaid view of a first subset of resources from the first isolated collection, one or more inferred rules from the first inference ruleset, and at least one asserted rule associated with the first subset of resources, and a second subset of resources from the second isolated collection of resources, one or more inferred rules from the second inference ruleset and at least a first asserted rule associated with the second subset of resources, wherein the one or more inferred rules from the first inference ruleset and the one or more rules from the second inference ruleset are displayed in a visually distinct manner that differentiates inferred rules from asserted rules;
         a rule view displaying first content of the one or more inferred rules from the first inference ruleset and second content of the one or more inferred rules from the second inference ruleset, wherein upon receiving an interaction with a displayed rule in the rule view, the associated rule is visually emphasized in the isolated collection view; and
         an options list comprising the one or more suggested operations, wherein a suggested operation relates to resolving a conflict between the first inference ruleset and the second inference ruleset, and wherein upon detecting an interaction with the suggested operation, an associated inferred rule is visually emphasized in the isolated collection view;
      receiving a selection relating to at least one of the one or more suggested operations;
      based on the received selection, generating a third inference ruleset;
      storing a third isolated collection comprising resources and asserted relationships from the first isolated collection and the second isolated collection, as well as a third plurality of inferred relationships based on the third inference rule set; and
      associating the third inference ruleset with the third isolated collection.

2. The system of claim 1, wherein the one or more suggested operations comprises selecting one of the one or more similar inference rules within the first inference ruleset and the second inference ruleset.

3. The system of claim 1, wherein the one or more suggested operations comprises selecting one or more similar inference rules within the first inference ruleset and the second inference ruleset.

4. The system of claim 1, wherein the one or more suggested operations comprises selecting either of a first inference rule from the first inference ruleset or a second inference rule from the second inference ruleset, wherein the first inference rule and the second inference rule describe a similar relationship.

5. The system of claim 1, wherein the one or more suggested operations comprises creating a third inference rule based on the one or more similar inference rules within the first inference ruleset and the second inference ruleset.

6. The system of claim 1, wherein the display comprises an overlay interface of:
- at least a first subset of the resources and asserted relationships of the first isolated collection;
- at least a second subset of the resources and asserted relationships of the second isolated collection; and
- a graphical representation of at least one of the one or more suggested operations.

7. A computer-implemented method for overlaying isolated collections, the method comprising:
- accessing a first isolated collection of resources and asserted relationships, and a second isolated collection of resources and asserted relationships;
- determining at least one common resource in the first and second isolated collection;
- identifying one or more resources or relationships within the first and second isolated collection relating to the at least one common resource;
- based on the determination, extracting a first inference ruleset from the first isolated collection and extracting a second inference ruleset from the second isolated collection; and
- generating an overlay, the overlay interface comprising:
  - an isolated collection view for displaying an overlaid view of a first subset of resources from the first isolated collection, one or more inferred rules from the first inference ruleset, and at least one asserted rule associated with the first subset of resources, and a second subset of resources from the second isolated collection of resources, one or more inferred rules from the second inference ruleset and at least a first asserted rule associated with the second subset of resources, wherein the one or more inferred rules from the first inference ruleset and the one or more rules from the second inference ruleset are displayed in a visually distinct manner that differentiates inferred rules from asserted rules;
  - a rule view displaying first content of the one or more inferred rules from the first inference ruleset and second content of the one or more inferred rules from the second inference ruleset, wherein upon receiving an interaction with a displayed rule in the rule view, the associated rule is visually emphasized in the isolated collection view; and
  - an options list comprising the one or more suggested operations, wherein a suggested operation relates to resolving a conflict between the first inference ruleset and the second inference ruleset, and wherein upon detecting an interaction with the suggested operation, an associated inferred rule is visually emphasized in the isolated collection view.

8. The computer-implemented method of claim 7, further comprising:
- generating a third isolated collection comprising the one or more resources or asserted relationships relating to the at least one common resource;
- processing the first inference ruleset and the second inference ruleset to generate a third inference ruleset; and
- associating the third inference ruleset with the third isolated collection.

9. The computer-implemented method of claim 8, wherein processing the first inference ruleset and the second inference ruleset further comprises:
- determining that a first inference rule from the first inference ruleset describes a similar relationship between a plurality of resources as a second inference rule from the second inference ruleset;
- receiving a selection of either the first inference rule or the second inference rule; and
- adding the selected inference rule to the third inference ruleset.

10. The computer-implemented method of claim 8, wherein processing the first inference ruleset and the second inference ruleset further comprises:
- determining that a first inference rule from the first inference ruleset describes a similar relationship between a plurality of resource identifiers as a second inference rule from the second inference ruleset;
- receiving a selection of both the first inference rule and the second inference rule; and
- adding the first inference rule and the second inference rule to the third inference ruleset.

11. The computer-implemented method of claim 8, wherein processing the first inference ruleset and the second inference ruleset further comprises:
- determining that a first inference rule from the first inference ruleset describes a similar relationship between a plurality of resource identifiers as a second inference rule from the second inference ruleset;
- receiving an indication that neither the first inference rule nor the second inference rule are selected; and
- adding neither the first inference rule nor the second inference rule to the third inference ruleset.

12. The computer-implemented method of claim 8, wherein processing the first inference ruleset and the second inference ruleset further comprises:
- determining that a first inference rule from the first inference ruleset describes a similar relationship between a plurality of resource identifiers as a second inference rule from the second inference ruleset;
- receiving a selection that a third inference rule should be created based on the first inference rule and the second inference;
- in response to the indication, generating the third inference rule based on the first inference rule and the second inference rule; and
- adding the third inference rule to the third inference ruleset.

13. The computer-implemented method of claim 8, wherein processing the first inference ruleset and the second inference ruleset further comprises:
- determining that a first inference rule from the first inference ruleset describes a similar relationship between a plurality of resource identifiers as a second inference rule from the second inference ruleset;
- automatically making a further determination based upon a previous preference indication, wherein the further determination comprises selecting the first inference rule, selecting the second inference rule, selecting neither inference rule, or generating a third inference rule based on the first inference rule and the second inference rule; and updating the third inference rule set based upon the selection.

14. A computer-implemented method for overlaying isolated collections, the method comprising:
accessing a first isolated collection of resources and asserted relationships, and a second isolated collection of resources and asserted relationships, wherein the first and second isolated collection comprise at least one common resource;
extracting a first inference ruleset from the first isolated collection;
extracting a second inference ruleset from the second isolated collection;
processing the first inference ruleset and the second inference ruleset to generate one or more suggested operations;
displaying an overlay interface, the overlay interface comprising:
an isolated collection view for displaying an overlaid view of a first subset of resources from the first isolated collection, one or more inferred rules from the first inference ruleset, and at least one asserted rule associated with the first subset of resources, and a second subset of resources from the second isolated collection of resources, one or more inferred rules from the second inference ruleset and at least a first asserted rule associated with the second subset of resources, wherein the one or more inferred rules from the first inference ruleset and the one or more rules from the second inference ruleset are displayed in a visually distinct manner that differentiates inferred rules from asserted rules;
a rule view displaying first content of the one or more inferred rules from the first inference ruleset and second content of the one or more inferred rules from the second inference ruleset, wherein upon receiving an interaction with a displayed rule in the rule view, the associated rule is visually emphasized in the isolated collection view; and
an options list comprising the one or more suggested operations, wherein a suggested operation relates to resolving a conflict between the first inference ruleset and the second inference ruleset, and wherein upon detecting an interaction with the suggested operation, an associated inferred rule is visually emphasized in the isolated collection view;
receiving a selection relating to at least one of the one or more suggested operations;
based on the received selection, generating a third inference ruleset;
storing a third isolated collection comprising resources and asserted relationships from the first isolated collection and the second isolated collection, as well as a third plurality of inferred relationships based on the third inference rule set; and
associating the third inference ruleset with the third isolated collection.

15. The computer-implemented method of claim 14, wherein the one or more suggested operations comprises selecting one of the one or more similar inference rules within the first inference ruleset and the second inference ruleset.

16. The computer-implemented method of claim 14, wherein the one or more suggested operations comprises selecting one or more similar inference rules within the first inference ruleset and the second inference ruleset.

17. The computer-implemented method of claim 14, wherein the one or more suggested operations comprises selecting either of one or more similar inference rules within the first inference ruleset or the second inference ruleset.

18. The computer-implemented method of claim 14, wherein the one or more suggested operations comprises creating a third inference rule based on the one or more similar inference rules within the first inference ruleset and the second inference ruleset.

19. The computer-implemented method of claim 14, receiving the selection comprises receiving an automatic indication based on a previous preference indication.

20. The computer-implemented method of claim 14, wherein the one or more suggested operations comprises selecting one or more similar inference rules within the first inference ruleset and the second inference ruleset and creating a third inference rule based on the one or more similar inference rules.

* * * * *